US012739152B2

(12) United States Patent
Horn et al.

(10) Patent No.: US 12,739,152 B2
(45) Date of Patent: Sep. 15, 2026

(54) CQI UNCERTAINTY REPORT FOR LATENCY REDUCTION IN MIRS

(71) Applicant: QUALCOMM Incorporated, San Diego, CA (US)

(72) Inventors: Idan Michael Horn, Hod Hasharon (IL); Gideon Shlomo Kutz, Ramat Hasharon (IL); Shay Landis, Hod Hasharon (IL); Assaf Touboul, Netanya (IL); Yehonatan Dallal, Kfar Saba (IL); Amit Bar-Or Tillinger, Tel-Aviv (IL); Eliyahu Arbiv, Nir Galim (IL); Lior Uziel, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 18/333,458

(22) Filed: Jun. 12, 2023

(65) Prior Publication Data

US 2024/0414031 A1 Dec. 12, 2024

(51) Int. Cl.

*H04L 25/02* (2006.01)
*H04B 7/06* (2006.01)
*H04L 1/00* (2006.01)

(52) U.S. Cl.

CPC ......... *H04L 25/024* (2013.01); *H04B 7/0632* (2013.01); *H04L 1/0003* (2013.01)

(58) Field of Classification Search

CPC ... H04W 52/146; H04W 52/08; H04W 52/10; H04W 52/242; H04W 52/06;

(Continued)

(56) References Cited

U.S. PATENT DOCUMENTS 7,974,242 B2 * 7/2011 Yang .................... H04L 1/0029 370/332
2008/0063095 A1 * 3/2008 Khayrallah ........... H04L 1/0009 375/260

(Continued)

FOREIGN PATENT DOCUMENTS

WO 2022162152 A2 8/2022

OTHER PUBLICATIONS

International Search Report and Written Opinion—PCT/US2024/031959—ISA/EPO—Sep. 23, 2024.

*Primary Examiner* — Olumide Ajibade Akonai
(74) *Attorney, Agent, or Firm* — QUALCOMM Incorporated

(57) ABSTRACT

The apparatus may be a UE configured to identify at least one performance metric associated with a channel estimation operation at the UE. The apparatus may further be configured to calculate at least one uncertainty value associated with the at least one performance metric. The apparatus may also be configured to transmit, to a network node, a first indication of the at least one uncertainty value associated with the at least one performance metric. The apparatus may be a network node, configured to receive, from a UE, the first indication and a second indication of at least one value for the at least one performance metric associated with the at least one uncertainty value and to select a set of parameters for a subsequent communication based on the at least one value for the at least one performance metric and the at least one uncertainty value.

30 Claims, 11 Drawing Sheets

(58) Field of Classification Search
CPC ........... H04W 72/1273; H04W 52/265; H04W 52/241; H04W 72/20; H04W 72/23; H04W 24/10; H04W 72/04; H04W 28/0221; H04W 72/541; H04W 72/542; H04W 52/24; H04W 72/51; H04L 1/0026; H04L 5/0057; H04L 2025/03426; H04L 25/03343; H04L 5/006; H04L 1/1819; H04L 1/0003; H04L 1/0009; H04L 1/1812; H04L 1/1845; H04L 1/1822; H04L 1/0025; H04L 1/1896; H04L 1/1825; H04L 1/1864; H04L 1/1887; H04B 7/0632; H04B 7/0417; H04B 7/0456; H04B 7/0626; H04B 7/0634; H04B 7/0639; H04B 7/0413; H04B 7/061; H04B 7/0636; H04B 17/336; H04B 7/0695
See application file for complete search history.

(56) References Cited

U.S. PATENT DOCUMENTS

2014/0056334 A1* 2/2014 Khina ................. H04L 25/0242 375/211
2014/0192732 A1* 7/2014 Chen ....................... H04L 1/003 370/328
2017/0237530 A1* 8/2017 Wesel ....................... H04L 1/22 375/295
2022/0256387 A1 8/2022 Xiao et al.
2024/0172026 A1* 5/2024 Bagheri ................ H04L 1/0026
2025/0063411 A1* 2/2025 Karapantelakis ..... H04W 24/10

* cited by examiner

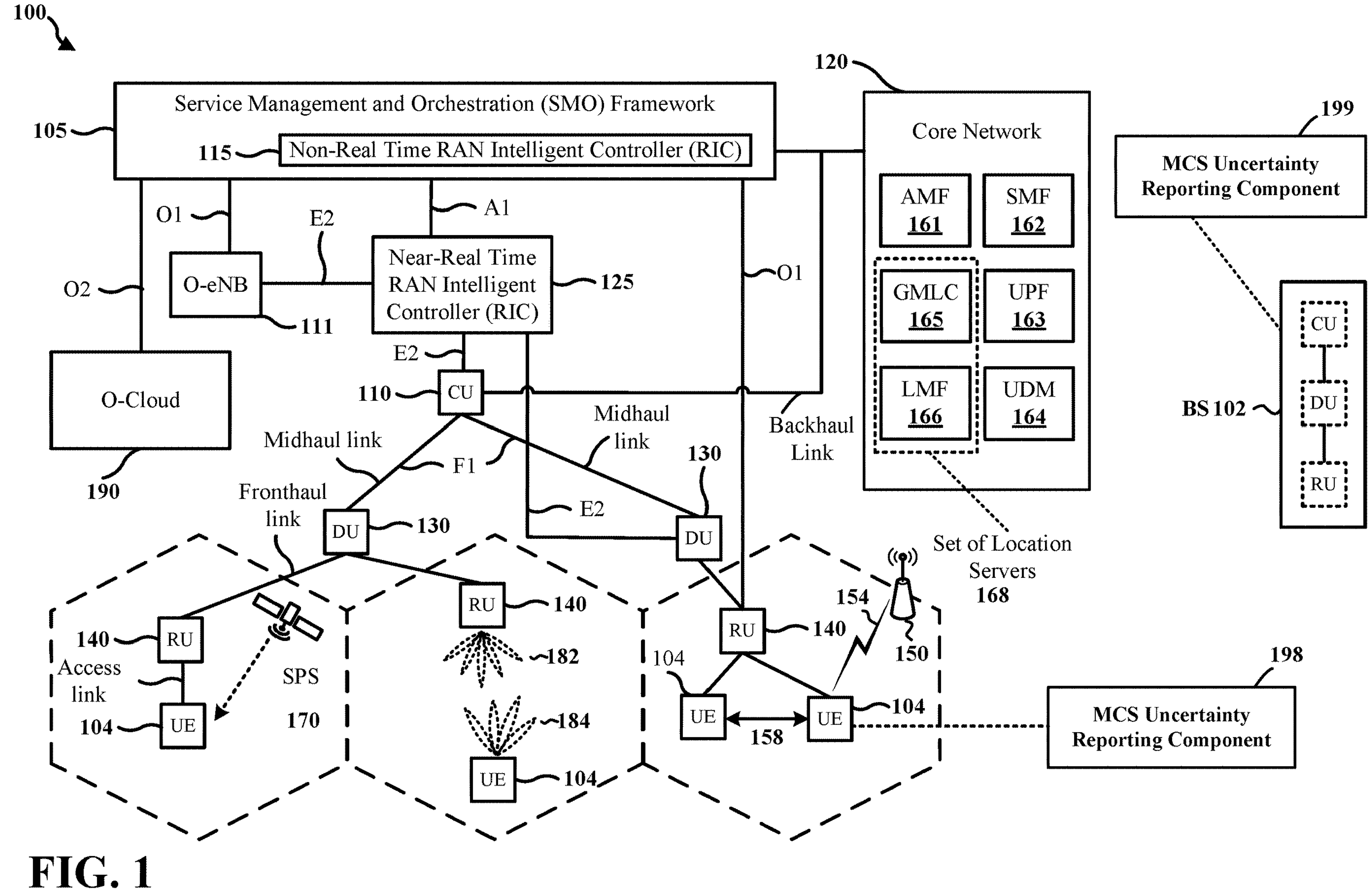
100
Service Management and Orchestration (SMO) Framework
105
115
Non-Real Time RAN Intelligent Controller (RIC)
O1
E2
A1
O2
O-eNB
111
Near-Real Time RAN Intelligent Controller (RIC)
125
O1
O-Cloud
190
E2
110
CU
Midhaul link
F1
Midhaul link
130
E2
Fronthaul link
DU
130
DU
Backhaul Link
120
Core Network
AMF 161
SMF 162
GMLC 165
UPF 163
LMF 166
UDM 164
Set of Location Servers 168
RU
140
RU
140
RU
140
Access link
104
UE
SPS
170
182
184
UE
104
104
UE
UE
104
158
154
150
MCS Uncertainty Reporting Component
199
BS 102
CU
DU
RU
MCS Uncertainty Reporting Component
198
FIG. 1

One Frame (TDD)
10 ms
200
subframe
RB
slot

D D D D D D D D D D D D F U
subcarrier
OFDM symbol
slot
DMRS R
CSI-RS
230
PDCCH CORESET
SSS
PSS
PDSCH
PBCH
REG 12 REs
1 CCE = 6 REGs
SS/PBCH Block
BWP
BWP
20 RBs
channel bandwidth RBs One Frame (TDD)
10 ms
250
subframe
RB
slot U U U U U U U U U U U U U U
subcarrier
SRS Comb 0
SRS Comb 1
OFDM symbol
slot
SRS
DMRS R
280
PUCCH
PUSCH

CQI UNCERTAINTY REPORT FOR LATENCY REDUCTION IN MIRS

TECHNICAL FIELD

The present disclosure relates generally to communication systems, and more particularly, to a multiple incremental redundancy scheme (MIRS) for identifying an optimized modulation and coding scheme for a communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless device or a component of a wireless device or user equipment (UE) configured to identify at least one performance metric associated with a channel estimation operation at the UE. The apparatus may further be configured to calculate at least one uncertainty value associated with the at least one performance metric. The apparatus may also be configured to transmit, to a network node, an indication of the at least one uncertainty value associated with the at least one performance metric.

In an aspect of the disclosure, a method, a computer-readable medium, and an apparatus are provided. The apparatus may be a network node, a network device or a component of a network node or network device configured to receive, from a UE, a first indication of at least one uncertainty value associated with at least one performance metric associated with a channel estimation operation at the UE. The apparatus may further be configured to receive, from the UE, a second indication of at least one value for the at least one performance metric associated with the at least one uncertainty value. The apparatus may also be configured to select a set of parameters for a subsequent communication based on the at least one value for the at least one performance metric and the at least one uncertainty value.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 1 is a diagram illustrating an example of a wireless communications system and an access network.

DETAILED DESCRIPTION

Figures 2A, 2B, 2C, 2D:
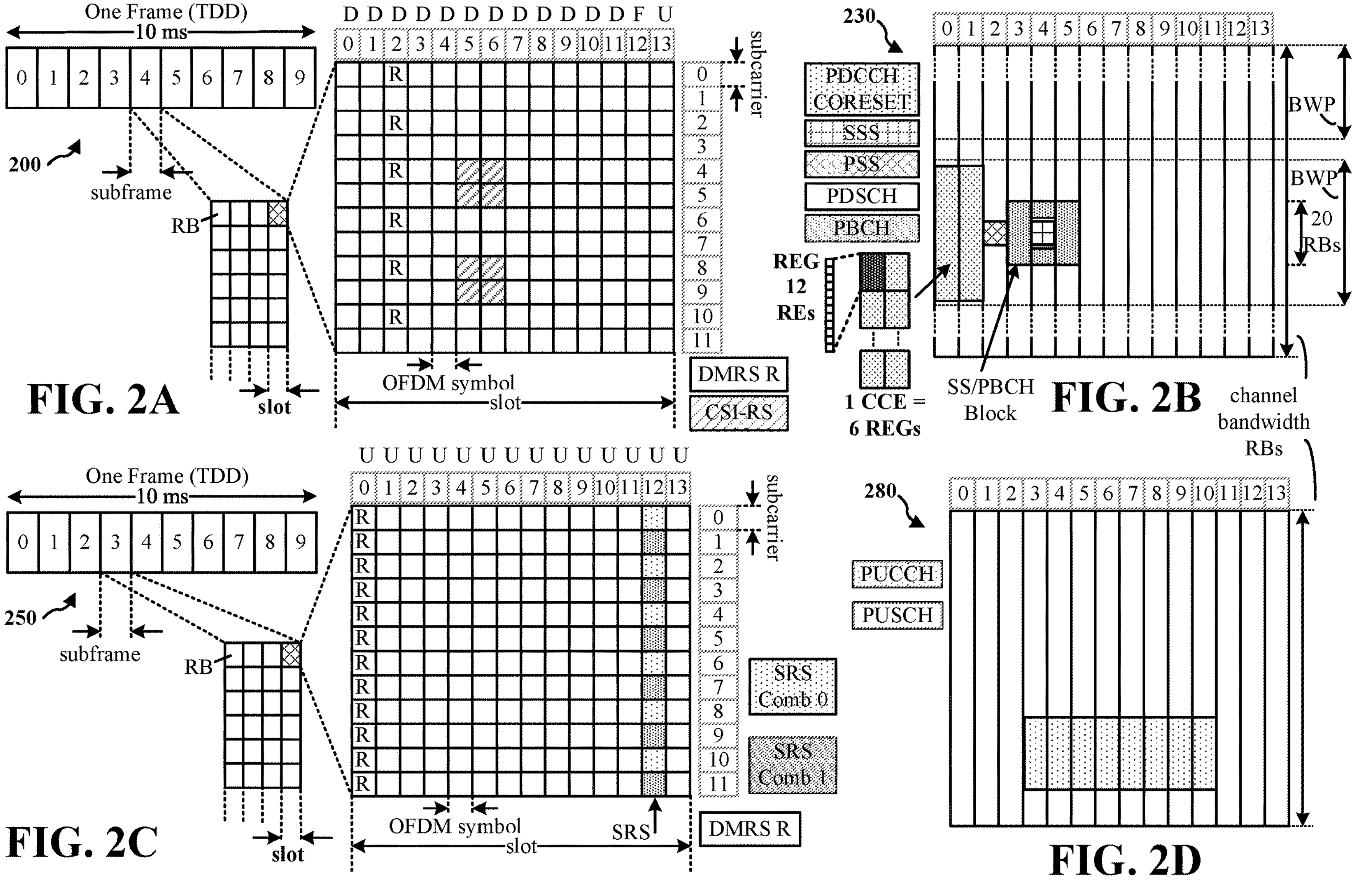
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

In some aspects of wireless communication, MIRS may be used to dynamically adjust one or more of a rate, precoding, and/or rank based on incremental redundancy (IR) hybrid automatic repeat request (HARQ) (IR-HARQ). In some aspects, a first transmission associated with the MIRS may use a higher modulation and coding scheme (MCS) (e.g., an MCS associated with a larger MCS index value or an MCS associated with a higher throughput) than an MCS indicated by channel state information (CSI) (e.g., based on a channel quality indicator (CQI) or rank indicator (RI) included in the CSI) and may rely on the multiple retransmissions to pass a cyclic redundancy check (CRC) on the transport block (TB) or code block (CB). The transmitting device (e.g., a base station or network node) may determine, for the first transmission, a first higher MCS (e.g., an MCS associated with an MCS index value that is three more than a reported MCS index value) according to a predefined (static) gap and/or a (static) lookup table (LUT). However, the above solution using a static offset from a reported MCS (e.g., an MCS based on a reported quantity) may be associated with a large latency for each CB due to the multiple retransmissions expected based on the use of the first (significantly) higher MCS.

Various aspects of the disclosure relate generally to an improvement to a MIRS (or outer loop link adaptation (OLLA)) that involves transmitting, from a receiving device, an uncertainty report associated with an MCS (or related characteristic) indicated by the receiving device (e.g., based on a receiving device's MCS estimation capabilities, channel conditions, Doppler effects, interference, signal to interference and noise ratio (SINR), etc.). While MIRS and OLLA are discussed below, they should be understood merely as examples of methods associated with determining an MCS for a particular communication that may be improved based on a received uncertainty report. For example, in some aspects of the disclosure, the receiving device (e.g., a wireless device or UE) may report to the transmitting device (e.g., a base station or network node) an indication of an uncertainty (e.g., an uncertainty report) associated with a CQI (or RI) estimation (e.g., via CSI) that the transmitting device may use to determine a (dynamic) gap (or offset) between a second higher MCS used for the first MIRS transmission and an MCS based on the values reported by the receiving device (e.g., a CQI and/or RI reported via a CSI) to reduce the latency associated with identifying or determining an MCS using the MIRS. Reducing the latency, in some aspects, may be based on the (dynamic) gap (from the reported uncertainty value and reported the CQI/RI estimation) being smaller than the (static) gap or offset (based on the reported CQI/RI estimation) such that a number of failed transmissions, and an associated time, due to intentionally using a too-high MCS for the first transmission is reduced for the MIRS.

While both the (static) gap, or offset, and the (dynamic) gap, or offset, may be based on a maximum expected difference between an MCS value based on set of measured values (e.g., values included in a CSI) and an optimal (or highest) MCS, the (dynamic) gap, or offset, may be associated with a smaller maximum expected difference based on the additional information provided by the receiving device. For example, a UE may report an (MCS) uncertainty value of "one MCS" such that, a base station may determine to use an MCS for a first transmission of the MIRS that is one MCS, or MCS index value, higher than a reported MCS (e.g., an MCS associated with a reported value in a CSI such as a CQI or RI) instead of a larger number of MCSs (e.g., three MCSs, or MCS index values, as described above). Accordingly, the optimal MCS may be identified with reduced latency when using the MIRS with the (MCS) uncertainty value reporting compared to the latency associated with using the MIRS without the (MCS) uncertainty value reporting while arriving at the same optimized MCS or code rate.

When applied to OLLA, the uncertainty value may provide a transmitting device (e.g., a network node or base station) with additional information that may improve the selection of an MCS for a subsequent transmission. For example, knowing that a reported value for a performance metric used to determine an MCS has an associated uncertainty of a first magnitude (e.g., larger or smaller than an assumed magnitude) may allow the transmitting device to increase an MCS (and an associated throughput) for a subsequent transmission beyond an MCS that may have been selected based on the reported value for the performance metric without the additional information.

Particular aspects of the subject matter described in this disclosure can be implemented to realize one or more of the following potential advantages. In some examples, by reporting at least one uncertainty value associated with at least one performance metric, the described techniques can be used to increase a throughput associated with one of an OLLA or the MIRS. Additionally, for the MIRS, the reporting of the uncertainty values may improve a latency associated with identifying (or converging to) an optimized MCS (e.g., a code rate and constellation) and throughput.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUS 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an MCS uncertainty reporting component 198 that may be configured to identify at least one performance metric associated with a channel estimation operation at the UE. The MCS uncertainty reporting component 198 may further be configured to calculate at least one uncertainty value associated with the at least one performance metric. The MCS uncertainty reporting component 198 may also be configured to transmit, to a network node, an indication of the at least one uncertainty value associated with the at least one performance metric. In certain aspects, the base station 102 may have an MCS uncertainty reporting component 199 that may be configured to receive, from a UE, a first indication of at least one uncertainty value associated with at least one performance metric associated with a channel estimation operation at the UE. The MCS uncertainty reporting component 199 may further be configured to receive, from the UE, a second indication of at least one value for the at least one performance metric associated with the at least one uncertainty value. The MCS uncertainty reporting component 199 may also be configured to select a set of parameters for a subsequent communication based on the at least one value for the at least one performance metric and the at least one uncertainty value. While aspects of the following description may relate to 5G NR, aspects may be applicable to other aspects of wireless communication.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
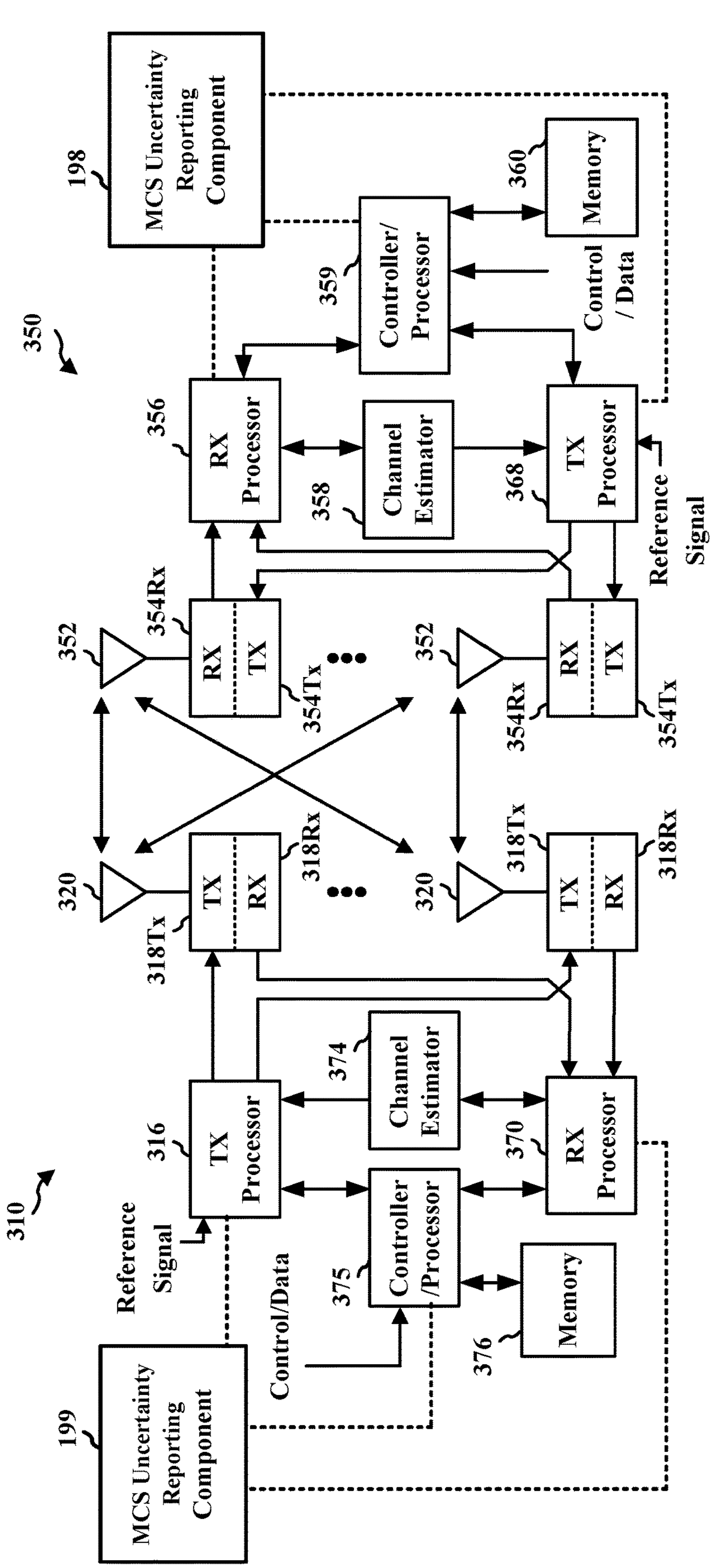
FIG. 3 is a diagram illustrating an example of a base station and UE in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (iFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antennas 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the MCS uncertainty reporting component 198 of FIG. 1.

At least one of the TX processor 316, the RX processor 370, and the controller/processor 375 may be configured to perform aspects in connection with the MCS uncertainty reporting component 199 of FIG. 1.

In some aspects, of wireless communication, e.g., 5G NR, a rate adaptation scheme is described that closes (or narrows) the gap between optimal link adaptation and current CSI-RS based link adaptation. A current CSI-RS based channel capacity tracking scheme may not be able to adapt to the instantaneous optimal MCS (e.g., a highest MCS that can be decoded successfully on a specific transmission time interval (TTI)). For example, the current scheme may not utilize the full available channel capacity because, inter alia, CSI-RS estimation is not perfect and often doesn't model the receiver's performance accurately, and a channel state may be sampled at discrete times (e.g., slots including CSI-RS which may be referred to as CSI-RS slots) while even at low velocities (e.g., for slowly moving wireless devices or UEs) the optimal MCS (and coding rate) may change between these CSI-RS slots significantly.

In the CSI-RS based channel capacity tracking scheme, the used MCS (specifically coding rate) may be set on the first transmission and may not be dynamically adapted. Accordingly, if a first transmission fails, approximately the same number of coded bits may be retransmitted without adjusting the number of coded bits based on the failure of the first transmission. A retransmission scheme associated with the CSI-RS based channel capacity tracking scheme may use a small set of redundancy versions (RVs) to select the bits for retransmission. These bits are either the same coded bits as the first transmission (e.g., for Chase combining) which results in a same code rate, or newly coded bits (e.g., for incremental redundancy), which may result in halving the effective coding rate in the second retransmission.

As a result, when using the CSI-RS based channel capacity tracking scheme a coding rate (or MCS) for the first transmission should be carefully selected. For example, an overestimated rate may result in decoding errors and may lead to throughput loss, while an underestimated rate may result in a loss of throughput compared to a larger payload that could have been transmitted over the same channel resource using an accurately estimated rate (or MCS).

Link adaptation between CSI-RS, in some aspects, may be done using an OLLA but it may not be able to track the optimal MCS changes accurately. Accordingly, even with optimal CSI estimation where MCS is optimally selected on CSI slots and regardless of using OLLA or not, the throughput performance is far from the achievable performance of optimal per slot MCS selection.

MIRS is a scheme that can close (or narrow) the gap to optimal MCS selection and achieve communication at (or near) capacity code rate, regardless of mobility. MIRS, in some aspects, may include using an overestimated MCS for a first transmission to ensure that throughput is not lost due to an underestimated rate. Fine-scale dynamic adaptation of the coding rate may be based on the use of small sized re-transmission based on receiver's ACK/NACK feedback (e.g., incremental redundancy (IR)-HARQ). For example, each time a receiver (e.g., a wireless device or UE receiving the transmissions associated with the MIRS) sends a NACK (or alternatively, does not send an ACK), a small number of additional redundancy bits may be transmitted. In some aspects, the MIRS may use per-CB feedback to maximize channel utilization further.

The use of per-CB feedback may include, selecting (e.g., at a transmitting device such as a network node or base station) an MCS for a first transmission that is expected to fail. The selection may determine the coding parameters (e.g., a rate, TBS, etc.) for the following retransmissions. For each decoding failure, the receiver sends a feedback with per-CB decoding results. In some aspects, the receiver may convey additional information to allow the transmitter to converge to an optimized rate more quickly (e.g., with a lower latency). Based on a reported failure (e.g., a failure to decode a TB or CB), the transmitter may schedule and transmit a small number of additional bits (parity bits or redundant bits) for a failing TB (or for a failing CB), compared to the initial coded bits buffer of the CBs. The added bits in a set of retransmissions may then be used to reduce the effective code rate of each CB in fine steps, until all CBs (and consequently the whole TB) are decoded successfully. The total number of bits, sent over first and subsequent transmissions is associated with (or may be used to calculate) the actual rate used for each TB. Accordingly, using the MIRS, may close (or narrow) the gap between an (instantaneous or per-slot, per-CB, or per-group-of-RBs) optimal MCS over a large SNR range by closely tracking channel variation to achieve higher throughput compared to the CSI-RS based channel capacity tracking scheme.

In some aspects of wireless communication, MIRS may be used to dynamically adjust one or more of a rate, precoding, and/or rank based on multiple IR-HARQ as described above. In some aspects, a first transmission associated with the MIRS may use a higher MCS than the reported (or indicated) MCS in CSI and may rely on the multiple retransmissions to pass CRC on the TB or CB as described above. The transmitting device (e.g., a base station or network node) may determine, for the first transmission, a first higher MCS (e.g., an MCS associated with an MCS index value that is three more than a reported MCS index value) according to a predefined (static) gap and/or a (static) LUT. However, the above solution using a static offset from a reported MCS may be associated with a large latency for each CB due to the multiple retransmissions expected based on the use of the first (significantly) higher MCS.

Various aspects of the disclosure relate generally to an improvement to a MIRS (or OLLA) involving transmitting, from a receiving device, an uncertainty report associated with an MCS indicated by the receiving device (e.g., based on a receiving device's MCS estimation capabilities, channel conditions, Doppler effects, interference, SINR, etc.). For example, in some aspects of the disclosure, the receiving device (e.g., a wireless device or UE) may report to the transmitting device (e.g., a base station or network node) an indication of an uncertainty (e.g., an uncertainty report) associated with a CQI (or RI) estimation that the transmitting device may use to determine a (dynamic) gap (or offset) between a second higher MCS used for the first MIRS transmission and an MCS based on values reported by the receiving device (e.g., a CQI and/or RI reported via a CSI) to reduce the latency associated with identifying or determining an MCS using the MIRS. In some aspects, an uncertainty value may indicate an expected accuracy (or inaccuracy) of a corresponding value for a particular performance metric or channel characteristic (e.g., a value reported in CSI or a value calculated based on one or more values reported in CSI). The uncertainty value, in some aspects, may be indicated in terms of the corresponding value (e.g., for a reported CQI index, the uncertainty value may be reported in terms of CQI indexes) and may indicate a maximum and/or minimum value that may be the accurate value (e.g., an actual, or optimal, value) associated with the particular performance metric or channel characteristic. Reducing the latency, in some aspects, may be based on the (dynamic) gap (based on the reported uncertainty value and reported the CQI/RI estimation) being smaller than the (static) gap or offset (based on the reported CQI/RI estimation) such that a number of failed transmissions, and an associated time, due to intentionally using a too-high MCS for the first transmission is reduced for the MIRS.

While both the (static) gap, or offset, and the (dynamic) gap, or offset, may be based on a maximum expected difference between an MCS value based on set of measured values (e.g., values included in a CSI) and an optimal (or highest) MCS, the (dynamic) gap, or offset, may be associated with a smaller maximum expected difference based on the additional information provided by the receiving device. For example, a UE may report an MCS uncertainty value of "one MCS" such that, a base station may determine to use an MCS for a first transmission of the MIRS that is one MCS, or MCS index value, higher than a reported MCS (e.g., an MCS associated with a value reported in, or associated with, a CSI such as a CQI, RI, SINR, reference signal received power (RSRP), received signal strength indicator (RSSI), etc.) instead of a larger number of MCSs (e.g., three MCSs, or MCS index values, as described above). Accordingly, the optimal MCS may be identified with reduced latency when using the MIRS with the MCS uncertainty value compared to the latency associated with using the MIRS without the MCS uncertainty value without affecting the performance (e.g., arriving at the same optimal MCS or code rate).

When applied to OLLA, the uncertainty value may provide a transmitting device (e.g., a network node or base station) with additional information that may improve the selection of an MCS for a subsequent transmission. For example, knowing that a reported value for a performance metric (e.g., a measured channel characteristic that may be associated with a throughput or other characteristic associated with a communication between the transmitting device and the receiving device) used to determine an MCS has an associated uncertainty of a first magnitude (e.g., larger or smaller than an assumed magnitude) may allow the transmitting device to increase an MCS (and an associated throughput) for a subsequent transmission beyond an MCS that may have been selected based on the reported value for the performance metric without the additional information.

Figure 4:
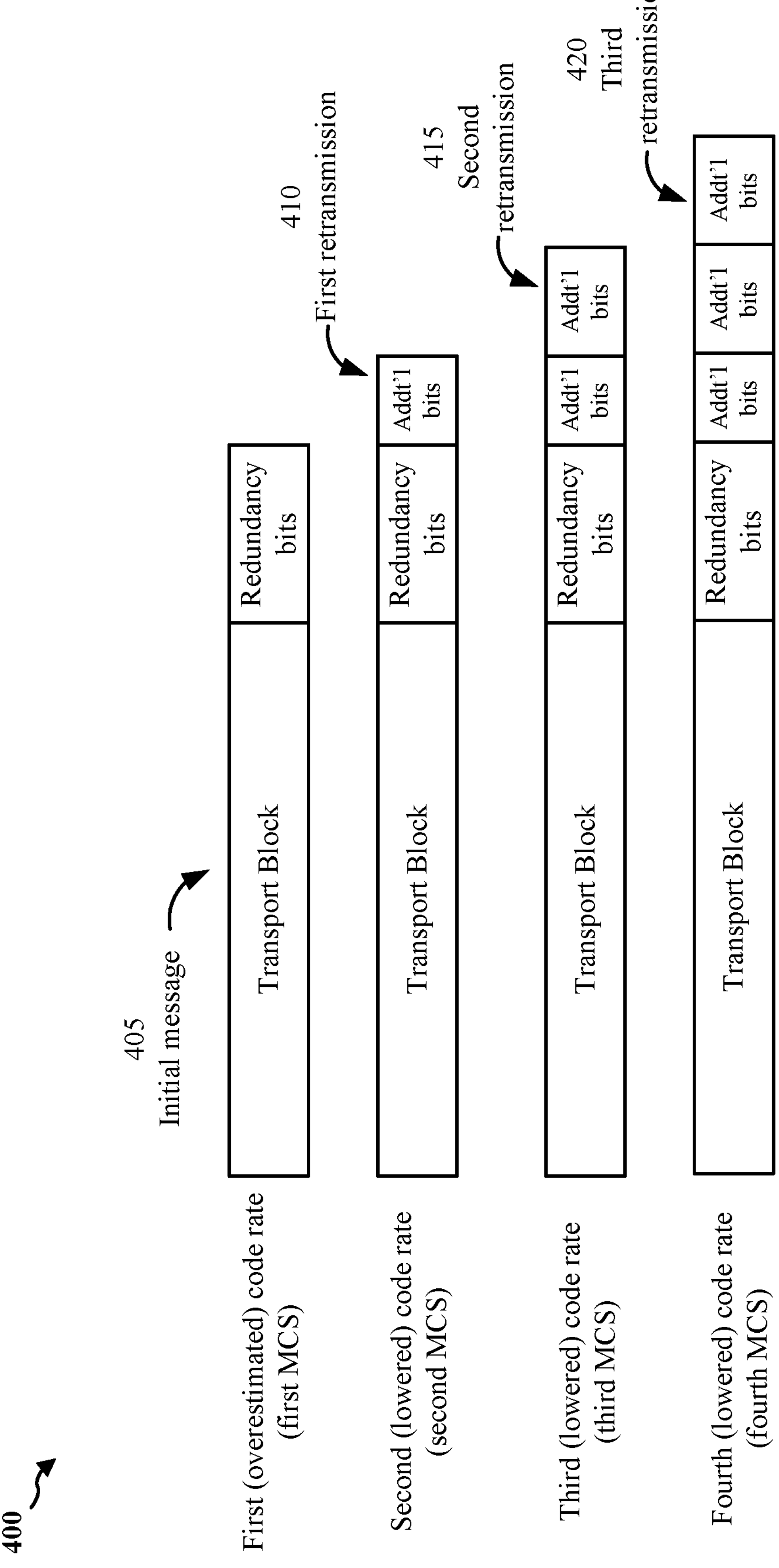
FIG. 4 is a diagram illustrating an example associated with a MIRS, in accordance with one or more aspects of the present disclosure.

FIG. 4 is a diagram illustrating an example 400 associated with a MIRS, in accordance with one or more aspects of the present disclosure. FIG. 4 depicts an initial message 405 and retransmissions 410, 415, and 420 of a communication. For example, the communication may be transmitted by a transmitter device, such as a network node (e.g., the base station 502 in FIG. 5) or a UE. The communication may be received by a receiver device such as a UE (e.g., the UE 504 in FIG. 5) or a network node.

For example, as shown in FIG. 4, the initial message 405 may include a TB that includes a payload (e.g., information bits or systematic bits) and one or more redundancy (parity) bits. The initial transmission may use a first code rate and/or a first MCS. The first code rate and/or the first MCS may be overestimated (e.g., for the channel) and/or may be a highest available or configured code rate and/or MCS. Alternatively, or additionally, the first code rate and/or the first MCS may be based on a known gap/offset (e.g., one of a preconfigured/predefined gap/offset or a gap/offset based on a LUT) from an MCS value reported by the receiver device (e.g., via CSI). In some aspects implementing uncertainty value reporting from the receiver device, the first code rate and/or the first MCS may further be based on the uncertainty value reported by the receiver device as described further below.

The first retransmission 410 may include a number of additional (redundant/parity) coded bits (e.g., from a set of bits associated with the TB). For example, a receiver device may be unable to successfully decode the TB using the initial message 405. Therefore, the transmitter device may schedule and/or transmit the first retransmission 410 to incrementally and effectively lower the code rate and/or the MCS for the communication. The number of additional coded bits included in the first retransmission 410 may lower the effective code rate and/or MCS for the communication to a second code rate and/or a second MCS.

The second retransmission 415 may include a number of additional (redundant/parity) coded bits (e.g., from the set of bits associated with the TB). For example, a receiver device may be unable to successfully decode the TB using the initial message 405 and the first retransmission 410. Therefore, the transmitter device may schedule and/or transmit the second retransmission 415 to incrementally and effectively lower the code rate and/or the MCS for the communication. The number of additional coded bits included in the second retransmission 415 may lower the effective code rate and/or the MCS for the communication to a third code rate and/or a third MCS.

The third retransmission 420 may include a number of additional (redundant/parity) coded bits (e.g., from the set of bits associated with the TB). For example, a receiver device may be unable to successfully decode the transport block using the initial message 405, the first retransmission 410, and the second retransmission 415. Therefore, the transmitter device may schedule and/or transmit the third retransmission 420 to incrementally and effectively lower the code rate and/or the MCS for the communication. The number of additional coded bits included in the third retransmission 420 may lower the effective code rate and/or the MCS for the communication to a third code rate and/or a third MCS.

As a result, the transmitter device may be enabled to incrementally lower the effective code rate for the communication using the retransmissions 410, 415, and 420. For example, if the receiver device is enabled to successfully decode the communication (e.g., the entire TB) after the transmission of the third retransmission, then the effective code rate for the communication (e.g., for the TB) may be based at least in part on the number of coded bits transmitted in the initial message 405, the first retransmission 410, the second retransmission 415, and the third retransmission 420. It should be appreciated that the number of retransmissions illustrated in FIG. 4 is illustrative and does not limit the disclosure. The transmitter device may transmit fewer than, or more than, three retransmissions in order for the receiver device to successfully decode the whole communication. The transmitter device may continue to provide retransmission(s) until the receiver device has successfully decoded the whole communication (e.g., when the CRC passes). As such, the transmitter device may cease further retransmissions upon receiving an ACK feedback from the receiver device, where the ACK feedback may indicate that the receiver device has successfully decoded the communication.

The initial message 405, the first retransmission 410, the second retransmission 415, and the third retransmission 420 may be transmitted in different time windows (e.g., in different slots). For example, the transmitter device may transmit the initial message 405 in a first slot. The transmitter device may transmit the first retransmission 410 in a second slot (e.g., may transmit the additional bits for the first retransmission 410 indicated in FIG. 4 in the second slot). The transmitter device may transmit the second retransmission 415 in a third slot (e.g., may transmit the additional bits for the second retransmission 415 indicated in FIG. 4 in the third slot). The transmitter device may transmit the third retransmission 420 in a fourth slot (e.g., may transmit the additional bits for the third retransmission 420 indicated in FIG. 4 in the fourth slot). As the retransmissions 410, 415, and/or 420 may be small sized retransmissions, the transmitter device may be enabled to transmit multiple retransmissions for different TBs in the same slot. For example, in the second slot, the transmitter device may transmit the first retransmission 410 and a different retransmission for a different TB (not shown in FIG. 4).

Figure 5:
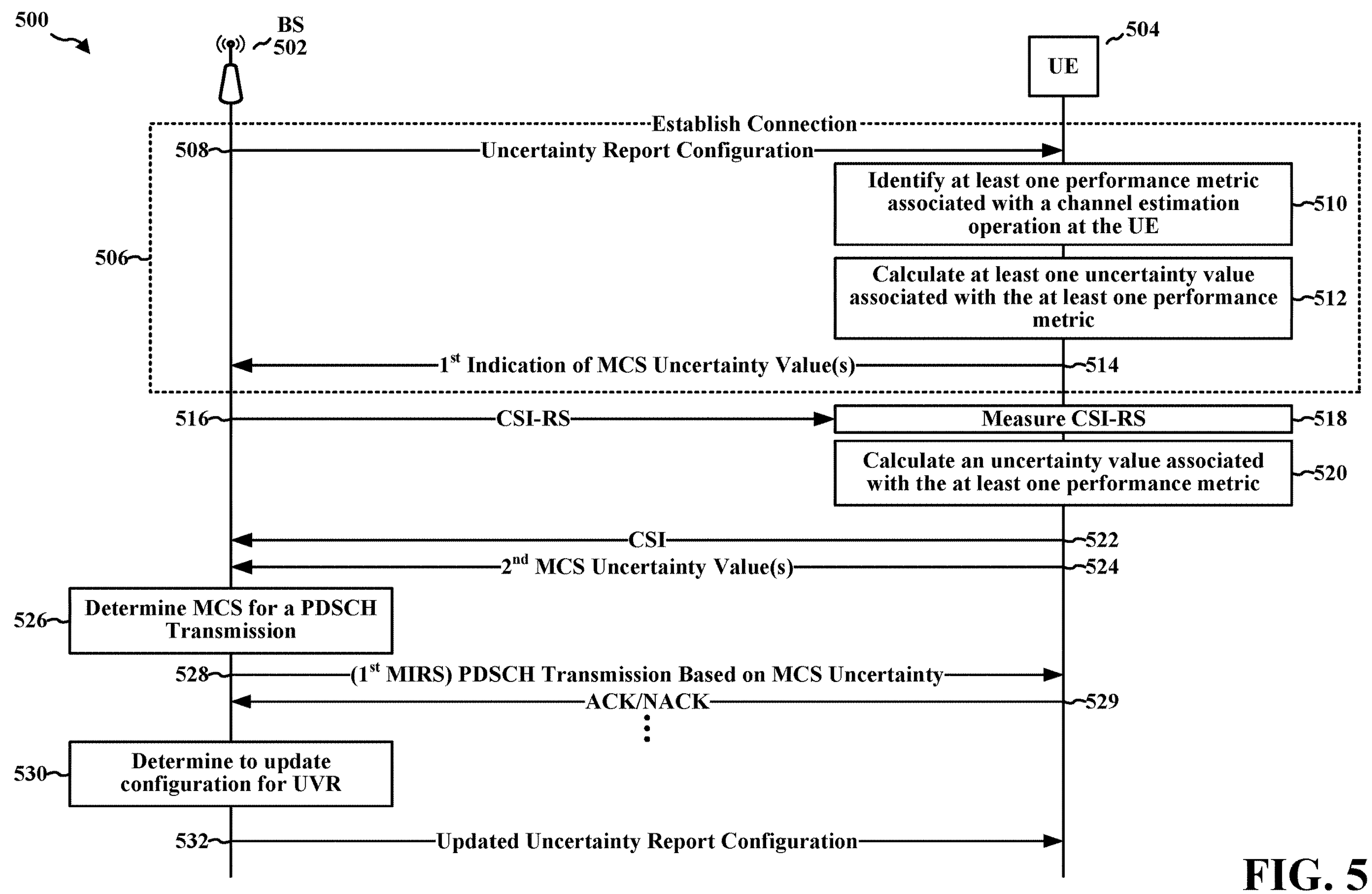
FIG. 5 is a call flow diagram illustrating the use of a reported uncertainty value in association with a MIRS in accordance with some aspects of the disclosure.

FIG. 5 is a call flow diagram 500 illustrating the use of a reported MCS uncertainty value in association with a MIRS in accordance with some aspects of the disclosure. The MIRS, in some aspects, may be associated with a communication between a base station 502 and a UE 504. The functions ascribed to the base station 502, in some aspects, may be performed by one or more components of a network node or a network device (a single network device/node or a disaggregated network device/node as described above in relation to FIG. 1). Similarly, the functions ascribed to the UE 504, in some aspects, may be performed by one or more components of a wireless device supporting communication with a network device/node and the MIRS. Accordingly, references to "transmitting" in the description below may be understood to refer to a first component of the base station 502 or the UE 504 outputting (or providing) an indication of the content of the transmission to be transmitted by a different component of the base station 502 or the UE 504. Similarly, references to "receiving" in the description below may be understood to refer to a first component of the base station 502 or the UE 504 receiving a transmitted signal and outputting (or providing) the received signal (or information based on the received signal) to a different component of the base station 502 or the UE 504.

As part of establishing a connection at 506 between the base station 502 and the UE 504, in some aspects, the base station 502 may transmit, and the UE 504 may receive, an uncertainty report configuration 508. The uncertainty report configuration 508, in some aspects, may be transmitted via an RRC message or a MAC-CE (or other similar layer 3 or layer 2 messaging as appropriate). For example, the uncertainty report configuration 508 may be transmitted/received as part of establishing a connection between the base station 502 with the UE 504 to configure a report of an uncertainty value. Additionally, or alternatively, the uncertainty report configuration 508 or an updated uncertainty report configuration 532 may be transmitted, in some aspects, if something changes at one of the base station 502 or the UE 504 (e.g., based on a trigger or triggering event) after a connection has been established. In some aspects, the uncertainty report configuration 508 may include a set of parameters associated with transmitting, from the UE 504, an indication of at least one uncertainty value associated with the MIRS (or an OLLA) as described below.

The set of parameters, in some aspects, may indicate a first subset of parameters associated with a capability of the network node and a second subset of parameters associated with a format for the indication of the uncertainty value. For example, the base station 502 may indicate via the uncertainty report configuration 508 (and the set of parameters) a maximum number of retransmissions supported by the base station 502, a granularity of the retransmissions (e.g., the unit of retransmission such as one of CB, multiple CBs, RB, multiple RBs, TB, etc.), and a retransmission applicable size (e.g., a size associated with retransmissions that may, in some aspects, be based on an MCS LUT). The uncertainty report configuration 508 (and the set of parameters) may additionally, or alternatively, indicate support for the uncertainty value reporting, a set of performance metrics for which to provide an indication of an associated uncertainty, a granularity of frequency resources associated with the uncertainty value reporting (e.g., a unit of frequency for which the base station 502 supports varying a code rate such as a sub-carrier, an RB including 12 sub-carriers, or a sub-band including multiple RBs within a wideband transmission), and a duration associated with a MIRS (e.g., a threshold time for refreshing or for a timeout associated with the MIRS). In some aspects, the uncertainty report configuration 508 (and the set of parameters) may additionally, or alternatively, indicate other configuration parameters related to a rank, PDSCH occupancy values (e.g., how many frequency resources are occupied by a PDSCH communication overlapping with a CSI-RS, where larger occupancy values may reduce resources at the UE 504 for, and an associated accuracy of, an estimation of channel quality), frequency bands, carriers, beam direction, SSBs, constellations (e.g., QPSK, 16QAM, etc.) associated with the uncertainty report (e.g., the uncertainty report configuration 508 may indicate to transmit an uncertainty value for each of a plurality of ranks, PDSCH occupancy value, frequency bands, and constellations). The uncertainty report configuration 508, in some aspects, may further include, or be associated with, one or more indexed lists, LUTs, or other indicated or preconfigured information for indicating the uncertainty value from the UE 504 to the base station 502.

In some aspects, for which the MIRS is unsupported, the uncertainty report configuration 508 may represent a configuration for an uncertainty report related to an OLLA and some of the parameters discussed above may be omitted as they may not be relevant to OLLA. For example, besides the MIRS-specific configuration parameters omitted because the MIRS is not supported, the uncertainty report configuration 508 may not indicate a granularity of frequency resources associated with the uncertainty value reporting when an OLLA is used to determine a single MCS applied to frequencies across a wideband (e.g., a full set of frequencies used for a particular connection or communication) as a single uncertainty value may be applied to determine the single MCS.

At 510, the UE 504 may identify (or determine) at least one performance metric associated with a channel estimation operation at the UE 504. In some aspects, the at least one performance metric may be one or more of a CQI, a RI, or other performance metric associated with a determination of an optimal MCS. The at least one performance metric, in some aspects, may be identified (or determined) based on the uncertainty report configuration 508.

In some aspects, the UE 504 may determine (or calculate), at 512, at least one uncertainty value that is not based on measured channel conditions. The at least one uncertainty value may include an uncertainty value associated with an MCS that is calculated for each supported rank at the UE 504. In some aspects, the at least one uncertainty value may include a plurality of uncertainty values including an uncertainty value for each MCS for each supported rank such that, when provided to the base station 502, the base station 502 may store the plurality of uncertainty values for later use to reduce overhead and/or to serve as a baseline uncertainty for a given MCS/rank combination. While discussed in relation to an MCS uncertainty value, the uncertainty values discussed below may, in some aspects, include uncertainty values associated with the CQI. RI, or other component of CSI. In some aspects, the uncertainty values are associated with the components of CSI that are used to determine the MCS for MIRS and/or OLLA based on which of the MIRS and/or OLLA are implemented by the base station 502 and/or the UE 504.

The unit associated with the at least one uncertainty value determined (or calculated) at 512 may be a known (or preconfigured) unit or may be associated with a requested (e.g., configured) attribute or parameter based on the uncertainty report configuration 508 or other message from the base station 502. For example, the at least one uncertainty value may be a unit related to an MCS (e.g., an MCS index value), a code rate, or a requested unit associated with, or related to, another known or requested parameter. In some aspects, the at least one uncertainty value determined (or calculated) at 512 may be an index value into a known, or configured, indexed list, codebook, or LUT (e.g., stored information that may be referenced to reduce overhead associated with an uncertainty value report or indication).

In some aspects, the at least one uncertainty value may include a plurality of uncertainty values that each correspond to one carrier frequency, frequency band, beam direction, and/or detected SSB in a plurality of carrier frequencies, frequency bands, beam directions, and/or detected SSBs, respectively. For example, in some aspects, an uncertainty value may be determined (or calculated) at 512 per carrier frequency, per frequency band, per beam direction, per detected SSB, and/or per each of one or more parameters reported in association with CSI (e.g., for each CQI value reported in CSI). In some aspects, a per carrier frequency, per frequency band, per beam direction, and/or per detected SSB may be based on a predicted uncertainty value associated with each carrier frequency, frequency band, beam direction, and/or detected SSB, where the prediction may be based on previous measurements made by the UE 504 and/or based on a (statistical) model/simulation of the uncertainty value for the carrier frequency, frequency band, beam direction, and/or detected SSB.

In some aspects, the at least one uncertainty value may be determined (or calculated) at 512 based on available hardware resources at the UE 504. As described above, multiple uncertainty values may be determined (or calculated) at 512 for multiple corresponding amounts of available resources. The amount of available resources may be indicated based on, or related to, the (modem) occupancy of a related PDSCH transmission. For example, each of the multiple uncertainty values may be associated with one or more threshold numbers of RBs associated with a PDSCH transmission transmitted via a same, overlapping, or adjacent set of time resources, where the allocation of CSI-RS resources may be increased or decreased based on the allocation of PDSCH resources. For example, a first uncertainty value may be associated with a related PDSCH transmission occupying 0 to N−1 RBs and a second uncertainty value may be associated with a related PDSCH transmission occupying N to 2N−1 RBs (e.g., where the value for N and the total number of uncertainty values may be based on the total number of hardware resources available for decoding at the UE 504). The base station 502, for a CSI-RS transmitted at a same/overlapping/adjacent time as a PDSCH communication occupying 'M' RBs, may use the at least one uncertainty value associated with the related PDSCH transmission occupying M RBs in addition to a reported value for a performance metric (e.g., a CQI or RI reported in CSI) based on the transmitted CSI-RS when determining an MCS for a subsequent transmission.

The at least one uncertainty value, in some aspects, may be determined (or calculated) at 512 for a plurality of modulation constellations, schemes, or orders (e.g., QPSK. 16QAM, 64 QAM, etc.). In some aspects, multiple values may be determined for multiple modulation constellations/schemes/orders because an uncertainty may change across modulation boundaries. For example, a first number of MCS indices may be determined for an uncertainty value associated with a first modulation constellations/schemes/orders while a second number of MCS indices may be determined for an uncertainty value associated with a second modulation constellations/schemes/orders such that for a determined MCS based on a reported performance metric (e.g., a CQI, RI, SINR, RSRP, RSSI, in, or associated with, CSI) that is near a transition from an MCS index associated with the first modulation order to an MCS index associated with the second modulation order, the base station may use the second uncertainty value to determine an MCS offset to use (and an MCS to use for the first transmission of the MIRS).

Based on the at least one uncertainty value determined at 512, the UE 504 may transmit, and the base station 502 may receive, a first indication of one or more MCS uncertainty values 514. The first indication of the one or more MCS uncertainty values 514, in some aspects, may include an indication of the at least one uncertainty value associated with the at least one performance metric calculated at 512. Accordingly, the first indication of the one or more MCS uncertainty values 514 may include any of the uncertainty values discussed in relation to calculating the at least one uncertainty value at 512 (e.g., any of the one or multiple uncertainty values associated with different parameter values or resources). In some aspects, the first indication of the one or more MCS uncertainty values 514 may be transmitted for use in association with the MIRS or in association with an OLLA in the absence of support for the MIRS. The first indication of the one or more MCS uncertainty values 514, in some aspects, may be transmitted via an RRC message or a MAC-CE (or other similar layer 3 or layer 2 messaging as appropriate). In some aspects, the first indication of the one or more MCS uncertainty values 514 may be sufficient to provide benefit without reporting an additional uncertainty value based on channel conditions or channel measurements (e.g., a second indication of one or more MCS uncertainty values 524 as described below).

In some aspects, after establishing a connection at 506, the base station 502 may transmit one or more CSI-RS 516 and the UE 504 may receive and measure, at 518, the one or more CSI-RS as part of a channel estimation operation. In some aspects, the one or more CSI-RS 516 may include, or be associated with, an indication to provide, or a request for, an uncertainty report (e.g., an indication of one or more uncertainty values). The indication/request included, or associated with, the one or more CSI-RS 516 may indicate for the UE 504 to transmit an updated uncertainty report (e.g., an indication of an update to one or more previously-reported uncertainty values). In some aspects, the one or more CSI-RS 516 may include, or be associated with, an indication of a PDSCH occupancy associated with at least one CSI-RS of the one or more CSI-RS 516. For example, if a PDSCH transmission occasion with little, or no, associated data will overlap with a set of time resource associated with the at least one CSI-RS, the base station 502 may indicate for the UE 504 to dedicate additional resources to decoding the at least one CSI-RS to reduce an uncertainty value associated with the channel estimation based on the at least one CSI-RS.

The UE 504, based on the measuring, at 518, of the one or more CSI-RS 516, may, at 520, calculate (or determine) one or more uncertainty value(s) associated with the at least one performance metric identified at 510. The one or more uncertainty value(s) may be associated with an MCS, a CQI, or RI. Calculating the one or more uncertainty values at 520, in some aspects, may be based on one or more of available resources (e.g., hardware resources) at the UE 504 and/or a configuration/request from the base station 502 as discussed above in relation to uncertainty report configuration 508 and/or CSI-RS 516. The UE 504, in some aspects, may, as part of measuring, at 518, the one or more CSI-RS 516, or as part of calculating the one or more uncertainty values at 520, identify (or determine/calculate) a value associated with the identified performance metric (e.g., a recommended MCS, a CQI to include in CSI, and/or an RI to include in CSI).

The calculation at 520, in some aspects, may be based on a (pretrained) LUT or other stored data or information based on multiple channel models, Doppler speeds, interference scenarios, etc. In some aspects, the calculation of the one or more uncertainty values at 520 may be based on running the full modem with data self-generation and adding noise based on an estimated SINR. The calculation of the one or more uncertainty values at 520, in some aspects, may be based on a rank associated with an identified (or determined/calculated) RI or according to the last number of layers received in the PDSCH.

After calculating the one or more uncertainty values at 520 (and/or identifying the value associated with the identified performance metric at 518 or 520), the UE 504 may transmit, and the base station 502 may receive, CSI 522 including one or more of a CQI or RI based on the one or more CSI-RS 516. In some aspects, the CSI 522 may be transmitted using a format that may also be used without additional reporting of the one or more uncertainty value(s). In some aspects, the CSI 522 may be transmitted using a format that may include additional information relating to uncertainty value reporting, e.g., a 1-bit indicator indicating that uncertainty values have not changed and no uncertainty value report will be transmitted by the UE or that uncertainty values have changed and an uncertainty value report will be transmitted by the UE. In some aspects, an uncertainty value report associated with the CSI 522 may include an indication of one or more difference(s) from (e.g., deltas or offsets for each of the one or more uncertainty values indicated in) one of an original (or baseline) uncertainty value report (e.g., an uncertainty value reported during a connection establishment such as the first indication of the one or more MCS uncertainty values 514) or an immediately-previous reported uncertainty value. For example, if the CSI 522 includes an indication that the calculated one or more uncertainty value(s) have changed from a last-reported (or baseline) set of one or more uncertainty value(s), the base station 502 may receive an uncertainty value report that may include a set of one or more associated (e.g., subsequently reported) uncertainty value(s) interpreted as a change to a set of one or more previously reported uncertainty value(s). Alternatively, if the CSI 522 includes an indication that the calculated one or more uncertainty value(s) have not changed from a last-reported (or baseline) set of one or more uncertainty value(s), the UE 504 may not transmit, and the base station 502 may not receive (and/or monitor for), the second indication of the one or more MCS uncertainty values 524 and the base station 502 may use the previously reported (or baseline) uncertainty values.

The UE 504 may, e.g., in association with a MIRS, additionally transmit, and the base station 502 may receive, the second indication of the one or more MCS uncertainty values 524. In some aspects, the UE 504 may transmit the second indication of the one or more MCS uncertainty values 524 based on one or more of a trigger or a request from the base station 502 (e.g., a request included in, or associated with, the one or more CSI-RS 516). The trigger, in some aspects, may be associated with one or more of a change in a serving beam (e.g., during a handover), or a calculated MCS uncertainty value changing from a previously reported MCS uncertainty value. As described above, the second indication of the one or more MCS uncertainty values 524 may include an uncertainty value (for MCS, CQI, and/or RI) per TB, CB, rank, unit of frequency, or other characteristic/parameter (e.g., as indicated in the uncertainty report configuration 508).

In some aspects, the base station 502 may, at 526, determine an MCS (and/or a rank) for a PDSCH transmission (e.g., a first transmission associated with a MIRS) based on the CSI 522, the first indication of the one or more MCS uncertainty values 514, and/or the second indication of the one or more MCS uncertainty values 524. The determination at 526, in some aspects, may further be based on a time offset (e.g., a distance in time) from a CSI-RS used to determine the MCS for the PDSCH transmission. For example, as more time elapses from a channel estimation the uncertainty of the channel estimation may increase based on larger channel variations being more likely between times separated by larger time differences.

Accordingly, a reported uncertainty value may be reported for a plurality of times from a CSI-RS transmission/measurement. Alternatively, or additionally, a reported uncertainty value may be modified based on a known elapsed time (e.g., a number of symbols or slots) from the CSI-RS associated with the reported uncertainty value (e.g., based on a linear function or some other function) and a set of parameters (e.g., a set of coefficients associated with a linear function) that may be known or indicated (e.g., in one of the uncertainty report configuration 508, the first indication of the one or more MCS uncertainty values 514, and/or the second indication of the one or more MCS uncertainty values 524). For example, the increase of the uncertainty value over time may be based on a parameter determined by long term channel conditions (e.g., a power delay profile (PDP), a Doppler spread, a Doppler shift, etc.). The uncertainty can therefore be specified as a linear function a*t+b, where t is associated with a time (e.g., measured in a number of symbols or slots) relative to a CSI-RS and a and b are the parameters/coefficients. In some aspects, a (and b) may be determined by the base station 502 or the UE 504 independently or based on negotiation between the base station 502 and the UE 504. For example, in some aspects, a could be determined internally by the base station 502 and b may be reported by the UE 504. In some aspects, the function may be a non-linear function based on selectable options.

The base station 502, in some aspects, may determine the MCS (and/or rank) for a PDSCH transmission (whether associated with a MIRS or an OLLA) at 526 based on an MCS (and/or rank) associated with one or more values included in CSI 522 (e.g., a CQI and/or RI used to determine an MCS and/or rank) and the uncertainty value (for MCS, CQI, and/or RI) included in the first indication of the one or more MCS uncertainty values 514 and/or the second indication of the one or more MCS uncertainty values 524. The MCS determined at 526, in some aspects, may be the MCS associated with the one or more values included in CSI 522 plus a most recently reported uncertainty value associated with the MCS. In some aspects, the MCS determined at 526 may be based on adding the MCS associated with the one or more values included in CSI 522 to the most recently reported uncertainty value associated with the MCS and then adding an additional offset.

The base station 502 may then transmit, and the UE 504 may receive, the PDSCH transmission 528 based on the determined MCS (e.g., the MCS determined based on the CSI 522 and at least one of the first indication of the one or more MCS uncertainty values 514 and/or the second indication of the one or more MCS uncertainty values 524). The transmission may be a first transmission associated with the MIRS using an MCS that is expected to be greater (e.g., be associated with a higher index value and/or a greater throughput) than an optimal MCS, or may be a PDSCH transmission based on an OLLA. Based on the PDSCH transmission 528, the UE 504 may transmit, and the base station 502 may receive feedback 529 including one of an ACK or NACK associated with a HARQ for OLLA, or an IR-HARQ for MIRS. The communication between the base station 502 and the UE 504 may continue with additional transmissions (e.g., retransmissions) from the base station 502 to the UE 504 and feedback from the UE 504 to the base station 502 (e.g., at least until an ACK is received).

The base station 502, in some aspects, may determine, at 530, to update an uncertainty value reporting configuration based on the feedback received from the UE 504 (e.g., feedback 529 and/or additional feedback). For example, if using an uncertainty value report (e.g., the first indication of the one or more MCS uncertainty values 514 and/or the second indication of the one or more MCS uncertainty values 524) leads to a higher-than-expected latency or a latency (e.g., a time from an initial transmission of the PDSCH transmission 528 to an indication of a successful decoding) above a threshold latency value, the base station 502, in some aspects, may determine to update a configuration of the uncertainty value report(s) at 530. In some aspects, the base station 502 may determine at 530 to request (or indicate) that additional resources (e.g., processing resources) at the UE 504 be used to determine the uncertainty value with greater accuracy. Alternatively, or additionally, the base station 502 may determine at 530 to request (or indicate) that the UE 504 discontinue (or omit transmitting) the uncertainty value report(s).

Based on the determination at 530, the base station 502 may transmit, and UE 504 may receive, an updated uncertainty report configuration 532. The updated uncertainty report configuration 532, in some aspects, may be smaller (e.g., include fewer bits and/or fields) than the uncertainty report configuration 508 as it may not include values for many of the parameters configured in the uncertainty report configuration 508. For example, the updated uncertainty report configuration 532 may indicate whether to dedicate additional resources (e.g., in the form of a minimum number of resources, a maximum uncertainty that is useful to report, or other related parameter) and/or whether to discontinue the transmission of the uncertainty value reports without indicating, e.g., the parameters associated with the MIRS or a (desired/requested) granularity of the uncertainty value report(s).

Figure 6:
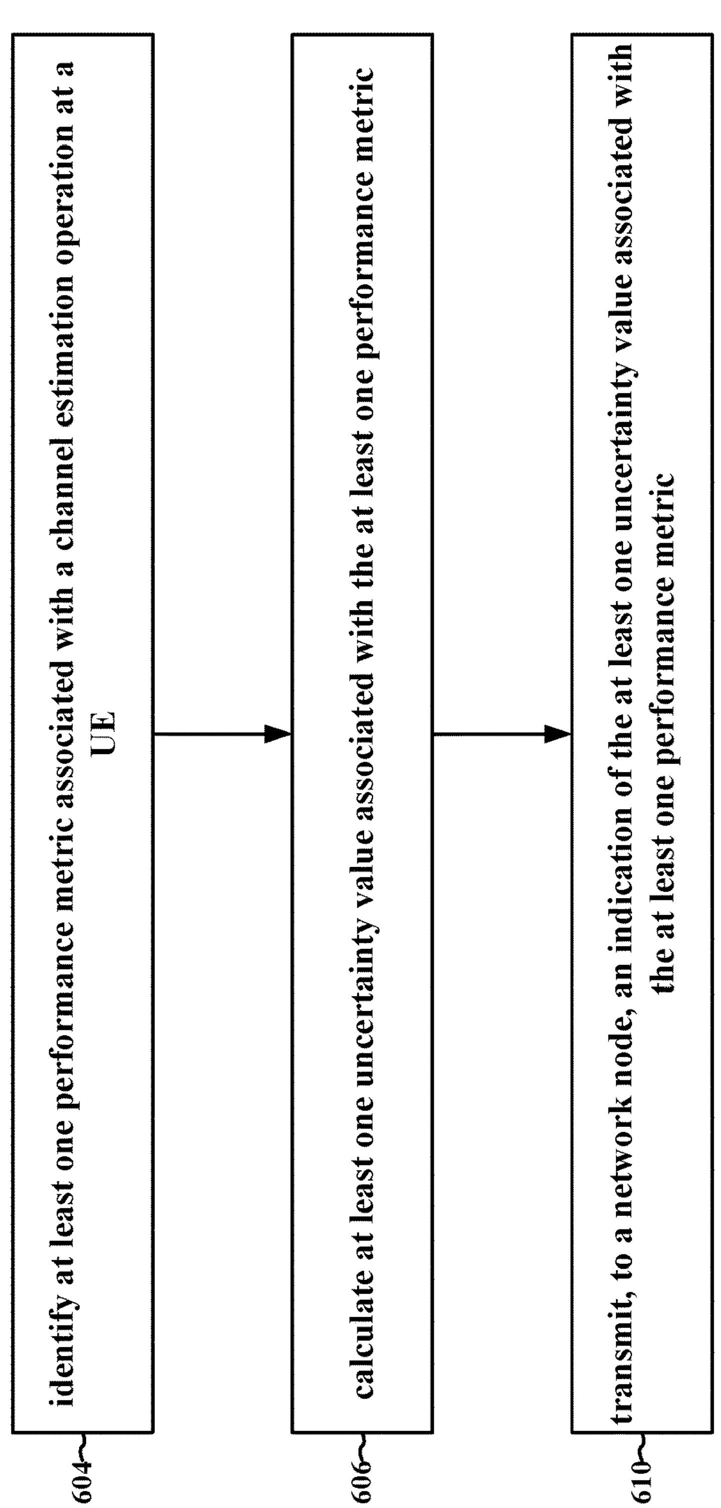
FIG. 6 is a flowchart of a method of wireless communication.

FIG. 6 is a flowchart 600 of a method of wireless communication. The method may be performed by a UE (e.g., the UE 104, 504; the apparatus 1004). In some aspects, the UE may receive, from a network node (e.g., a base station or base station component) as part of establishing a connection with the UE, a (second) indication of a set of parameters associated with transmitting an indication of at least one uncertainty value. In some aspects, the set of parameters indicates a first subset of parameters associated with a capability of the network node and a second subset of parameters associated with a format for a first indication of at least one uncertainty value associated with at least one performance metric. The first subset of parameters, in some aspects may include a maximum number of retransmissions supported by the network node, a granularity of the retransmissions (e.g., the unit of retransmission such as one of CB, multiple CBs, RB, multiple RBs, TB, etc.), and a retransmission applicable size (e.g., a size associated with retransmissions that may, in some aspects, be based on an MCS LUT). The second subset of parameters, in some aspects, may indicate for the UE to transmit a plurality of MCS uncertainty values corresponding to at least one of: a plurality of sub-carriers, a plurality of RBs including 12 sub-carriers, a plurality of sub-bands including multiple RBs within a full bandwidth (e.g., associated with a wideband transmission). In some aspects, the second subset of parameters may indicate for the UE to transmit an MCS uncertainty value corresponding to the full bandwidth (e.g., a set of frequency resources associated with the wideband transmission). For example, referring to FIG. 5, the UE 504 may receive the uncertainty report configuration 508.

At 604, the UE may identify at least one performance metric associated with a channel estimation operation at the UE. For example, 604 may be performed by application processor(s) 1006, cellular baseband processor(s) 1024, and/or MCS uncertainty reporting component 198 of FIG. 10. In some aspects, the at least one performance metric is one or more of a CQI or an RI. The at least one performance metric, in some aspects, may be based on the indication of the set of parameters associated with transmitting the indication of the at least one uncertainty value. For example, referring to FIG. 5, the UE 504 may identify, at 510, at least one performance metric associated with a channel estimation operation at the UE 504 based on the uncertainty report configuration 508.

At 606, the UE may calculate at least one uncertainty value associated with the at least one performance metric. For example, 606 may be performed by application processor(s) 1006, cellular baseband processor(s) 1024, and/or MCS uncertainty reporting component 198 of FIG. 10. The at least one uncertainty value, in some aspects, may be associated with one or more of the CQI or the RI. In some aspects, the at least one uncertainty value may include a first uncertainty value for at least one of a first MCS value or a rank indicator value. In some aspects, the at least one uncertainty value may be at least one hardware-dependent (e.g., a channel-condition-independent) uncertainty value calculated independently from a particular channel estimation operation. The at least one hardware-dependent uncertainty value, in some aspects, may include a hardware-dependent uncertainty value for each MCS for each supported rank. In some aspects, the hardware-dependent uncertainty value for each MCS for each supported rank may be associated with one of an MCS index or a code rate. The at least one hardware-dependent uncertainty value, in some aspects, may further be associated with one of: each frequency band in a plurality of frequency bands, each beam direction in a plurality of beam directions, or each SSB in a plurality of SSBs. In some aspects, calculating the hardware-dependent uncertainty value at 606 may be associated with establishing a connection with the network node for the channel estimation operation. For example, referring to FIG. 5, the UE 504 may calculate, at 512, at least one uncertainty value that is not based on measured channel conditions.

In some aspects, the UE may perform a channel estimation operation and may transmit CSI to the network node based on the channel estimation. The CSI, in some aspects, may include information regarding channel quality (e.g., CQI) and a rank (e.g., an RI) that may be used in some aspects, to determine an MCS for subsequent data transmissions from the network node. The channel estimation and transmitted CSI may be based on the indication of a set of parameters associated with transmitting the indication of the at least one uncertainty value. Accordingly, the calculation at 606 may alternatively, or additionally, include calculating, based on the channel estimation and/or CSI-RS, the plurality of uncertainty values (e.g., MCS uncertainty values) corresponding to at least one of: the plurality of sub-carriers, the plurality of RBs including 12 sub-carriers, a plurality of sub-bands including multiple RBs within a wideband transmission. In some aspects, the uncertainty value calculated at 606 may include an MCS uncertainty value corresponding to the full bandwidth of the wideband transmission. For example, referring to FIG. 5, the UE 504 may calculate, at 520, at least one uncertainty value based on channel conditions estimated based on receiving the one or more CSI-RS 516 and measuring the CSI-RS at 518 as part of a channel estimation operation based on the uncertainty report configuration 508.

The UE may, in some aspects, transmit, to a network node, an indication of (e.g., a value indicating) whether at least one uncertainty value (e.g., an uncertainty value calculated at 606) is different from a previously-reported uncertainty value. The indication of whether the at least one uncertainty value is different, in some aspects, may be transmitted in a CSI or as a separate indication. For example, referring to FIG. 5, the UE 504 may transmit the CSI 522 to the base station 502 including an indication that the at least one uncertainty value calculated at 520 is different from a previously-reported uncertainty value.

At 610, the UE may transmit, to a network node, an indication of the at least one uncertainty value associated with the at least one performance metric. For example, 610 may be performed by application processor(s) 1006, cellular baseband processor(s) 1024, transceiver(s) 1022, antenna(s) 1080, and/or MCS uncertainty reporting component 198 of FIG. 10. In some aspects, the at least one uncertainty value may include the at least one hardware-dependent uncertainty value. For example, referring to FIG. 5, the UE 504 may transmit the first indication of the one or more MCS uncertainty values 514 to the base station 502 based on calculating the at least one uncertainty value at 512.

In some aspects, the at least one uncertainty value includes a first uncertainty value for a first MCS value. The first uncertainty value for the first MCS value, in some aspects, may be associated with a first modulation scheme (e.g., a first constellation from among QPSK, 16QAM, 64 QAM, etc.). In some aspects, the at least one uncertainty value may further include a second uncertainty value for a second MCS value associated with a second modulation scheme (e.g., a second constellation from among QPSK, 16QAM, 64 QAM, etc.). In some aspects, the at least one uncertainty value includes the plurality of MCS uncertainty values indicated in the second subset of parameters associated with a format for the first indication and calculated at 606. For example, referring to FIG. 5, the UE 504 may transmit the second indication of the one or more MCS uncertainty values 524, based on the uncertainty values calculated at 520.

After transmitting the indication of the at least one uncertainty value associated with the at least one performance metric, in some aspects, the UE may receive a data transmission associated with at least one of an MCS or a rank based on the indication of the at least one uncertainty value. In some aspects using the uncertainty value reporting for OLLA, the hardware-dependent uncertainty value may be sufficient to provide improved performance and the MCS or the rank may be based on the indication of the at least one hardware-dependent uncertainty value without the additional uncertainty value based on the channel estimation (e.g., the UE may omit transmitting the uncertainty value based on the channel estimation). For example, referring to FIG. 5, the UE 504 may receive the PDSCH transmission 528 based on the MCS and/or rank determined at 526 that may be determined based on the first indication of the one or more MCS uncertainty values 514, based on the second indication of the one or more MCS uncertainty values 524, or based on both the first indication of the one or more MCS uncertainty values 514 and based on the second indication of the one or more MCS uncertainty values 524.

The UE, in some aspects, may transmit feedback (e.g., a HARQ or IR-HARQ) in response to the received data transmission. The at least one of the MCS or rank may be based on a reported value in CSI (e.g., associated with the identified performance metric) and the at least one uncertainty value. For example, referring to FIG. 5, the UE 504 may receive the PDSCH transmission 528 based on the MCS and/or rank determined at 526.

Based on the feedback, the UE may receive, from the network node, an updated indication of a set of parameters associated with transmitting the indication of the at least one uncertainty value. The updated indication, in some aspects, may indicate whether to dedicate additional resources (e.g., in the form of a minimum number of resources, a maximum uncertainty that is useful to report, or other related parameter) and/or whether to discontinue the transmission of the uncertainty value reports. In some aspects, the updated indication may include an update to the parameters associated with the MIRS or a (desired/requested) granularity of the uncertainty value report(s) as discussed for the indication of the set of parameters associated with transmitting the indication of the at least one uncertainty value. For example, referring to FIG. 5, the UE 504 may receive the updated uncertainty report configuration 532 based on the feedback 529.

Figure 7:
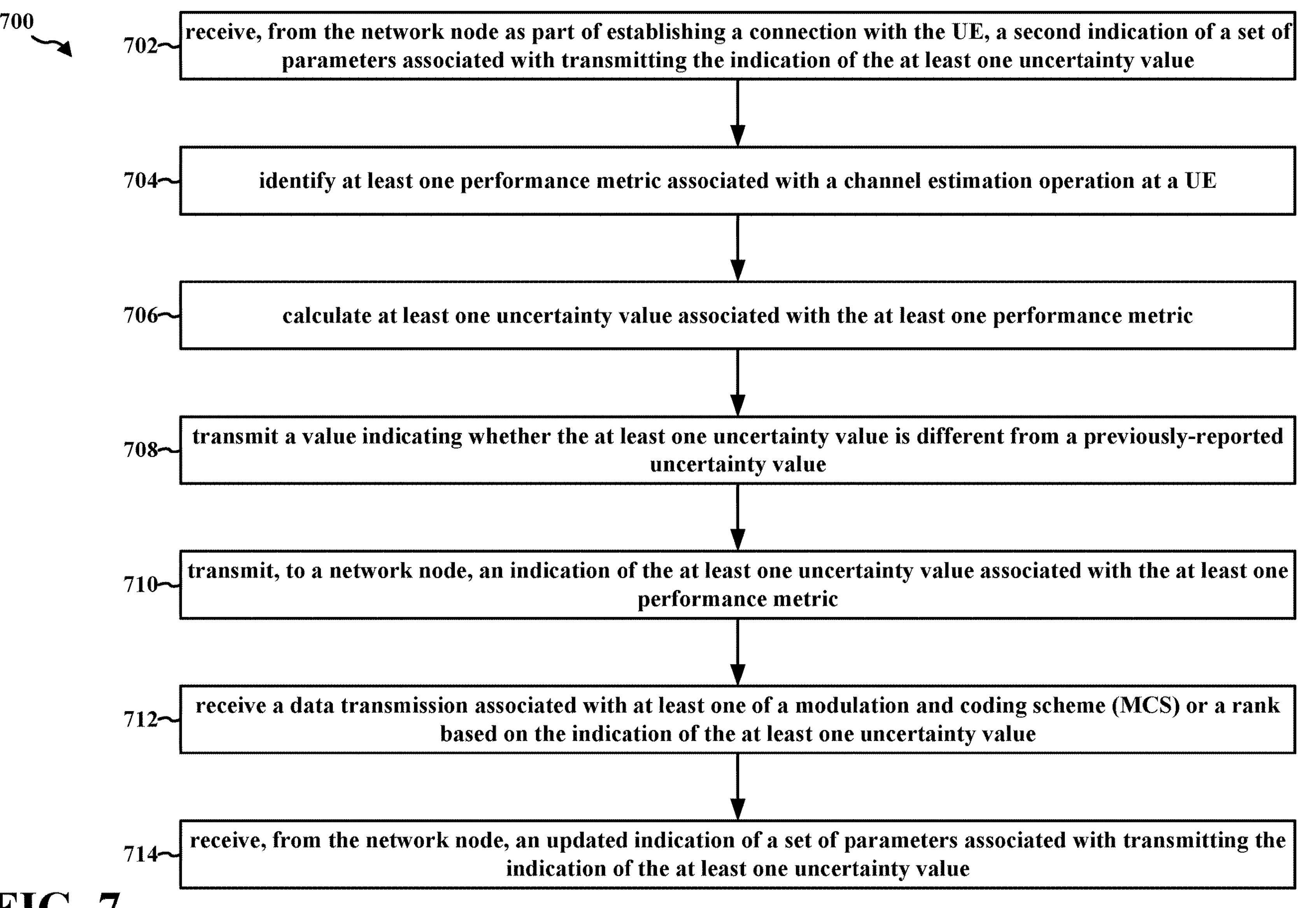
FIG. 7 is a flowchart of a method of wireless communication.

FIG. 7 is a flowchart 700 of a method of wireless communication. The method may be performed by a UE (e.g., the UE 104, 504; the apparatus 1004). At 702, the UE may receive, from a network node (e.g., a base station or base station component) as part of establishing a connection with the UE, a (second) indication of a set of parameters associated with transmitting an indication of at least one uncertainty value. For example, 702 may be performed by application processor(s) 1006, cellular baseband processor(s) 1024, transceiver(s) 1022, antenna(s) 1080, and/or MCS uncertainty reporting component 198 of FIG. 10. In some aspects, the set of parameters indicates a first subset of parameters associated with a capability of the network node and a second subset of parameters associated with a format for a first indication of at least one uncertainty value associated with at least one performance metric. The first subset of parameters, in some aspects may include a maximum number of retransmissions supported by the network node, a granularity of the retransmissions (e.g., the unit of retransmission such as one of CB, multiple CBs, RB, multiple RBs, TB, etc.), and a retransmission applicable size (e.g., a size associated with retransmissions that may, in some aspects, be based on an MCS LUT). The second subset of parameters, in some aspects, may indicate for the UE to transmit a plurality of MCS uncertainty values corresponding to at least one of: a plurality of sub-carriers, a plurality of RBs including 12 sub-carriers, a plurality of sub-bands including multiple RBs within a wideband transmission. In some aspects, the second subset of parameters may indicate for the UE to transmit an MCS uncertainty value corresponding to the full bandwidth (e.g., a set of frequency resources associated with the wideband transmission). For example, referring to FIG. 5, the UE 504 may receive the uncertainty report configuration 508.

At 704, the UE may identify at least one performance metric associated with a channel estimation operation at the UE. For example, 704 may be performed by application processor(s) 1006, cellular baseband processor(s) 1024, and/or MCS uncertainty reporting component 198 of FIG. 10. In some aspects, the at least one performance metric is one or more of a CQI or an RI. The at least one performance metric, in some aspects, may be based on the indication of the set of parameters associated with transmitting the indication of the at least one uncertainty value. For example, referring to FIG. 5, the UE 504 may identify, at 510, at least one performance metric associated with a channel estimation operation at the UE 504.

At 706, the UE may calculate at least one uncertainty value associated with the at least one performance metric. For example, 706 may be performed by application processor(s) 1006, cellular baseband processor(s) 1024, and/or MCS uncertainty reporting component 198 of FIG. 10. The at least one uncertainty value, in some aspects, may be associated with one or more of the CQI or the RI. In some aspects, the at least one uncertainty value may include a first uncertainty value for at least one of a first MCS value or a rank indicator value. In some aspects, the at least one uncertainty value may be at least one hardware-dependent (e.g., a channel-condition-independent) uncertainty value calculated independently from a particular channel estimation operation. The at least one hardware-dependent uncertainty value, in some aspects, may include a hardware-dependent uncertainty value for each MCS for each supported rank. In some aspects, the hardware-dependent uncertainty value for each MCS for each supported rank may be associated with one of an MCS index or a code rate. The at least one hardware-dependent uncertainty value, in some aspects, may further be associated with one of: each frequency band in a plurality of frequency bands, each beam direction in a plurality of beam directions, or each SSB in a plurality of SSBs. In some aspects, the at least one uncertainty value may include a first uncertainty value associated with a first set of conditions (e.g., a first amount of resources associated with a PDSCH transmission that overlaps or is adjacent to an instance of CSI-RS) and a second uncertainty value associated with a second set of conditions (e.g., a second amount of resources associated with a PDSCH transmission that overlaps or is adjacent to an instance of CSI-RS). Calculating the hardware-dependent uncertainty value at 706, in some aspects, may be associated with establishing a connection with the network node for the channel estimation operation. For example, referring to FIG. 5, the UE 504 may calculate, at 512, at least one uncertainty value that is not based on measured channel conditions.

In some aspects, the UE may perform a channel estimation operation and may transmit CSI to the network node based on the channel estimation. The CSI, in some aspects, may include information regarding channel quality (e.g., CQI) and a rank (e.g., an RI) that may be used in some aspects, to determine an MCS for subsequent data transmissions from the network node. The channel estimation and transmitted CSI may be based on the indication of a set of parameters associated with transmitting the indication of the at least one uncertainty value. Accordingly, the calculation at 706 may alternatively, or additionally, include calculating, based on the channel estimation and/or CSI-RS, the plurality of uncertainty values (e.g., MCS uncertainty values) corresponding to at least one of: the plurality of sub-carriers, the plurality of RBs including 12 sub-carriers, a plurality of sub-bands including multiple RBs within a wideband transmission. In some aspects, the uncertainty value calculated at 706 may include an MCS uncertainty value corresponding to the full bandwidth of the wideband transmission. For example, referring to FIG. 5, the UE 504 may calculate, at 520, at least one uncertainty value based on channel conditions estimated based on receiving the one or more CSI-RS 516 and measuring the CSI-RS at 518 as part of a channel estimation operation.

At 708, the UE may transmit, to a network node, an indication of (e.g., a value indicating) whether at least one uncertainty value (e.g., an uncertainty value calculated at 706) is different from a previously-reported uncertainty value. For example, 708 may be performed by application processor(s) 1006, cellular baseband processor(s) 1024, transceiver(s) 1022, antenna(s) 1080, and/or MCS uncertainty reporting component 198 of FIG. 10. The indication of whether the at least one uncertainty value is different, in some aspects, may be transmitted in a CSI or as a separate indication. For example, referring to FIG. 5, the UE 504 may transmit the CSI 522 to the base station 502 including an indication that the at least one uncertainty value calculated at 520 is different from a previously-reported uncertainty value.

At 710, the UE may transmit, to a network node, an indication of the at least one uncertainty value associated with the at least one performance metric. For example, 710 may be performed by application processor(s) 1006, cellular baseband processor(s) 1024, transceiver(s) 1022, antenna(s) 1080, and/or MCS uncertainty reporting component 198 of FIG. 10. In some aspects, the at least one uncertainty value may include the at least one hardware-dependent uncertainty value. For example, referring to FIG. 5, the UE 504 may transmit the first indication of the one or more MCS uncertainty values 514 to the base station 502 based on calculating the at least one uncertainty value at 512.

In some aspects, the at least one uncertainty value includes a first uncertainty value for a first MCS value. The first uncertainty value for the first MCS value, in some aspects, may be associated with a first modulation scheme (e.g., a first constellation from among QPSK. 16QAM, 64 QAM, etc.) In some aspects, the at least one uncertainty value may further include a second uncertainty value for a second MCS value associated with a second modulation scheme (e.g., a second constellation from among QPSK. 16QAM, 64 QAM, etc.). In some aspects, the at least one uncertainty value includes the plurality of MCS uncertainty values indicated in the second subset of parameters associated with a format for the first indication and calculated at 706. For example, referring to FIG. 5, the UE 504 may transmit the second indication of the one or more MCS uncertainty values 524, based on the uncertainty values calculated at 520.

At 712, the UE may receive a data transmission associated with at least one of an MCS or a rank based on the indication of the at least one uncertainty value. For example, 712 may be performed by application processor(s) 1006, cellular baseband processor(s) 1024, transceiver(s) 1022, antenna(s) 1080, and/or MCS uncertainty reporting component 198 of FIG. 10. In some aspects using the uncertainty value reporting for OLLA, the hardware-dependent uncertainty value may be sufficient to provide improved performance and the MCS or the rank may be based on the indication of the at least one hardware-dependent uncertainty value without the additional uncertainty value based on the channel estimation (e.g., the UE may omit transmitting the uncertainty value based on the channel estimation). For example, referring to FIG. 5, the UE 504 may receive the PDSCH transmission 528 based on the MCS and/or rank determined at 526 that may be determined based on the first indication of the one or more MCS uncertainty values 514, based on the second indication of the one or more MCS uncertainty values 524, or based on both the first indication of the one or more MCS uncertainty values 514 and based on the second indication of the one or more MCS uncertainty values 524.

The UE, in some aspects, may transmit feedback (e.g., a HARQ or IR-HARQ) in response to the received data transmission. The at least one of the MCS or rank may be based on a reported value in CSI (e.g., associated with the identified performance metric) and the at least one uncertainty value. For example, referring to FIG. 5, the UE 504 may receive the PDSCH transmission 528 based on the MCS and/or rank determined at 526.

At 714, the UE may receive, from the network node, an updated indication of a set of parameters associated with transmitting the indication of the at least one uncertainty value. For example, 714 may be performed by application processor(s) 1006, cellular baseband processor(s) 1024, transceiver(s) 1022, antenna(s) 1080, and/or MCS uncertainty reporting component 198 of FIG. 10. The updated indication, in some aspects, may indicate whether to dedicate additional resources (e.g., in the form of a minimum number of resources, a maximum uncertainty that is useful to report, or other related parameter) and/or whether to discontinue the transmission of the uncertainty value reports. In some aspects, the updated indication may include an update to the parameters associated with the MIRS or a (desired/requested) granularity of the uncertainty value report(s) as discussed for the indication of the set of parameters received at 702. For example, referring to FIG. 5, the UE 504 may receive the updated uncertainty report configuration 532 based on the feedback 529.

Figure 8:
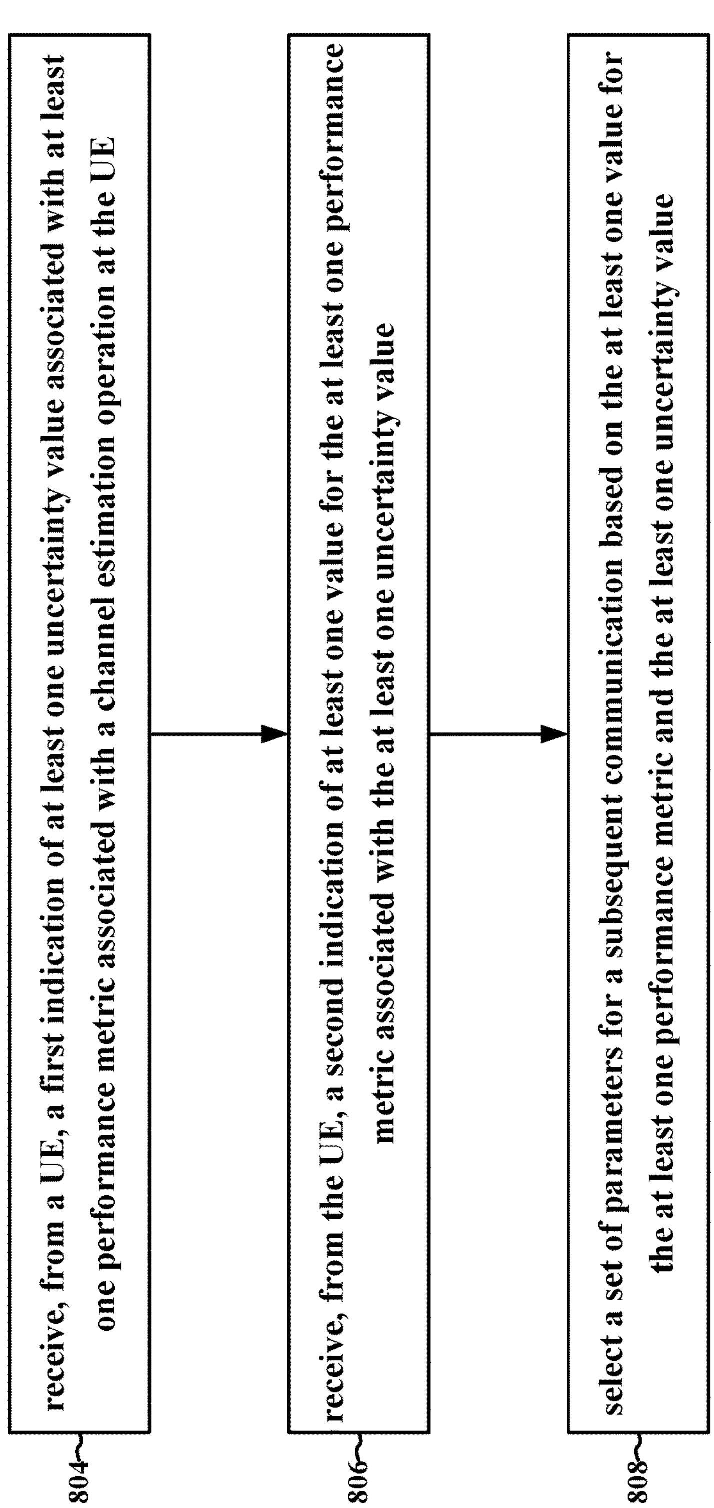
FIG. 8 is a flowchart of a method of wireless communication.

FIG. 8 is a flowchart 800 of a method of wireless communication. The method may be performed by a base station (e.g., the base station 102, 502; the network entity 1002, 1102). The base station may transmit, for a UE (e.g., a wireless device) as part of establishing a connection with the UE, a (third) indication of a set of parameters associated with transmitting an indication of at least one uncertainty value. In some aspects, the set of parameters indicates a first subset of parameters associated with a capability of the network node and a second subset of parameters associated with a format for a first indication of at least one uncertainty value associated with at least one performance metric. The first subset of parameters, in some aspects may include a maximum number of retransmissions supported by the network node, a granularity of the retransmissions (e.g., the unit of retransmission such as one of CB, multiple CBs, RB, multiple RBs, TB, etc.), and a retransmission applicable size (e.g., a size associated with retransmissions that may, in some aspects, be based on an MCS LUT). The second subset of parameters, in some aspects, may indicate for the UE to transmit a plurality of MCS uncertainty values corresponding to at least one of: a plurality of sub-carriers, a plurality of RBs including 12 sub-carriers, or a plurality of sub-bands including multiple RBs within a wideband transmission. In some aspects, the second subset of parameters may indicate for the UE to transmit an MCS uncertainty value corresponding to the full bandwidth. For example, referring to FIG. 5, the base station 502 may transmit the uncertainty report configuration 508.

At 804, the base station may receive, from a UE, a first indication of at least one uncertainty value associated with at least one performance metric associated with a channel estimation operation at the UE. For example, 804 may be performed by CU processor(s) 1112, DU processor(s) 1132, RU processor(s) 1142, transceiver(s) 1146, antenna(s) 1180, and/or MCS uncertainty reporting component 199 of FIG. 11. The at least one uncertainty value, in some aspects, may be associated with one or more of a CQI or a RI. In some aspects, the at least one uncertainty value includes a first uncertainty value for at least one of a first MCS value or a rank indicator value. In some aspects, the at least one uncertainty value may be at least one hardware-dependent (e.g., a channel-condition-independent) uncertainty value calculated independently from a particular channel estimation operation. The at least one hardware-dependent uncertainty value, in some aspects, may include a hardware-dependent uncertainty value for each MCS for each supported rank (e.g., a rank that the UE supports). In some aspects, the hardware-dependent uncertainty value for each MCS for each supported rank may be associated with one of an MCS index or a code rate. The at least one hardware-dependent uncertainty value, in some aspects, may further be associated with one of: each frequency band in a plurality of frequency bands, each beam direction in a plurality of beam directions, or each SSB in a plurality of SSBs. In some aspects, receiving the hardware-dependent uncertainty value at 806 may be associated with establishing a connection with the UE for the channel estimation operation. For example, referring to FIG. 5, the base station 502 may receive the first indication of the one or more MCS uncertainty values 514 (that is a hardware-dependent uncertainty value not based on channel measurements).

In some aspects, the base station may participate in (e.g., transmit a CSI-RS for) a channel estimation operation and may receive CSI from the UE based on the channel estimation. The CSI, in some aspects, may include information regarding channel quality (e.g., a CQI) and a rank (e.g., an RI) that may be used in some aspects, to determine an MCS for subsequent data transmissions from the base station. The channel estimation and received CSI may be based on the indication of a set of parameters associated with transmitting the indication of the at least one uncertainty value. Accordingly, the indication received at 806 may alternatively, or additionally, include receiving the plurality of uncertainty values (e.g., MCS uncertainty values) corresponding to at least one of: the plurality of sub-carriers, the plurality of RBs including 12 sub-carriers, a plurality of sub-bands including multiple RBs within a wideband transmission. In some aspects, the indication received at 806 may include an MCS uncertainty value corresponding to the full bandwidth (e.g., a set of frequency resources associated with the wideband transmission). For example, referring to FIG. 5, the base station 502 may receive the first indication of the one or more MCS uncertainty values 514 based on hardware-dependent parameters/characteristics and/or the second indication of the one or more MCS uncertainty values 524 based on channel conditions estimated based on transmitting the one or more CSI-RS 516 as part of a channel estimation operation.

In some aspects, the at least one uncertainty value may include the at least one hardware-dependent uncertainty value. For example, referring to FIG. 5, the base station 502 may receive the first indication of the one or more MCS uncertainty values 514 from the UE 504. In some aspects, the at least one uncertainty value includes a first uncertainty value for a first MCS value. The first uncertainty value for the first MCS value, in some aspects, may be associated with a first modulation scheme (e.g., a first constellation from among QPSK, 16QAM, 64 QAM, etc.). In some aspects, the at least one uncertainty value may further include a second uncertainty value for a second MCS value associated with a second modulation scheme (e.g., a second constellation from among QPSK, 16QAM, 64 QAM, etc.). In some aspects, the at least one uncertainty value includes the plurality of MCS uncertainty values indicated in the second subset of parameters associated with a format for the first indication. For example, referring to FIG. 5, the base station 502 may receive the second indication of the one or more MCS uncertainty values 524.

At 806, the base station may receive, from the UE, a second indication of at least one value for the at least one performance metric associated with the at least one uncertainty value. For example, 806 may be performed by CU processor(s) 1112, DU processor(s) 1132, RU processor(s) 1142, transceiver(s) 1146, antenna(s) 1180, and/or MCS uncertainty reporting component 199 of FIG. 11. In some aspects, the at least one performance metric is one or more of a CQI or an RI. The at least one performance metric, in some aspects, may be based on the indication of the set of parameters associated with transmitting the indication of the at least one uncertainty value. For example, referring to FIG. 5, the base station 502 may receive the CSI 522 based on transmitting the one or more CSI-RS 516. As indicated in FIG. 5, the second indication may be received at 806, before receiving the first indication at 804.

The base station, in some aspects, may receive, from the UE, an indication of (e.g., a value indicating) whether the at least one uncertainty value (e.g., an uncertainty value received at 804) is different from a previously-reported uncertainty value. The indication of whether the at least one uncertainty value is different, in some aspects, may be transmitted in a CSI (a CSI received at 806 including the at least one value for the at least one performance metric) or as a separate indication. For example, referring to FIG. 5, the base station 502 may receive the CSI 522 from the UE 504 including an indication that the at least one uncertainty value is different from a previously-reported uncertainty value.

At 808, the base station may select a set of parameters for a subsequent communication based on the at least one value for the at least one performance metric and the at least one uncertainty value. For example, 808 may be performed by CU processor(s) 1112, DU processor(s) 1132, RU processor(s) 1142, and/or MCS uncertainty reporting component 199 of FIG. 11. In some aspects, the set of parameters may include determine an MCS (or rank) associated with the subsequent communication. The MCS (and/or a rank) for a PDSCH transmission (e.g., a first transmission associated with a MIRS or a PDSCH transmission associated with an OLLA) based on the first indication of the at least one uncertainty value received at 804 and the second indication received at 806. Selecting the set of parameters at 808, in some aspects, may further be based on a time offset (e.g., a distance in time) from a CSI-RS used to determine the set of parameters for the subsequent communication. In some aspects using the uncertainty value reporting for OLLA, the hardware-dependent uncertainty value may be sufficient to provide improved performance and the MCS or the rank may be based on the indication of the at least one hardware-dependent uncertainty value without the additional uncertainty value based on the channel estimation (e.g., the base station may omit receiving the uncertainty value based on the channel estimation). For example, referring to FIG. 5, the base station 502 may determine, at 526, an MCS and/or rank based on the first indication of the one or more MCS uncertainty values 514, based on the second indication of the one or more MCS uncertainty values 524, or based on both the first indication of the one or more MCS uncertainty values 514 and based on the second indication of the one or more MCS uncertainty values 524.

The base station may transmit a data transmission associated with the selected set of parameters. In some aspects, the data transmission may be a PDSCH transmission associated with the MIRS. For example, referring to FIG. 5, the base station 502 may transmit the PDSCH transmission 528 based on the MCS and/or rank determined at 526.

The base station, in some aspects, may receive feedback (e.g., a HARQ or IR-HARQ) in response to the transmitted data. The at least one of the MCS or rank may be based on a reported value in CSI (e.g., associated with the identified performance metric) and the uncertainty value. For example, referring to FIG. 5, the base station 502 may receive the PDSCH transmission 528 based on the MCS and/or rank determined at 526.

In some aspects, the base station may transmit, for the UE, an updated indication of a set of parameters associated with transmitting the indication of the at least one uncertainty value. The updated indication, in some aspects, may indicate whether to dedicate additional resources (e.g., in the form of a minimum number of resources, a maximum uncertainty that is useful to report, or other related parameter) and/or whether to discontinue the transmission of the uncertainty value reports. In some aspects, the updated indication may include an update to the parameters associated with the MIRS or a (desired/requested) granularity of the uncertainty value report(s) as discussed for the indication of the set of parameters transmitted by the base station. For example, referring to FIG. 5, the base station 502 may transmit the updated uncertainty report configuration 532 based on the feedback 529.

Figure 9:
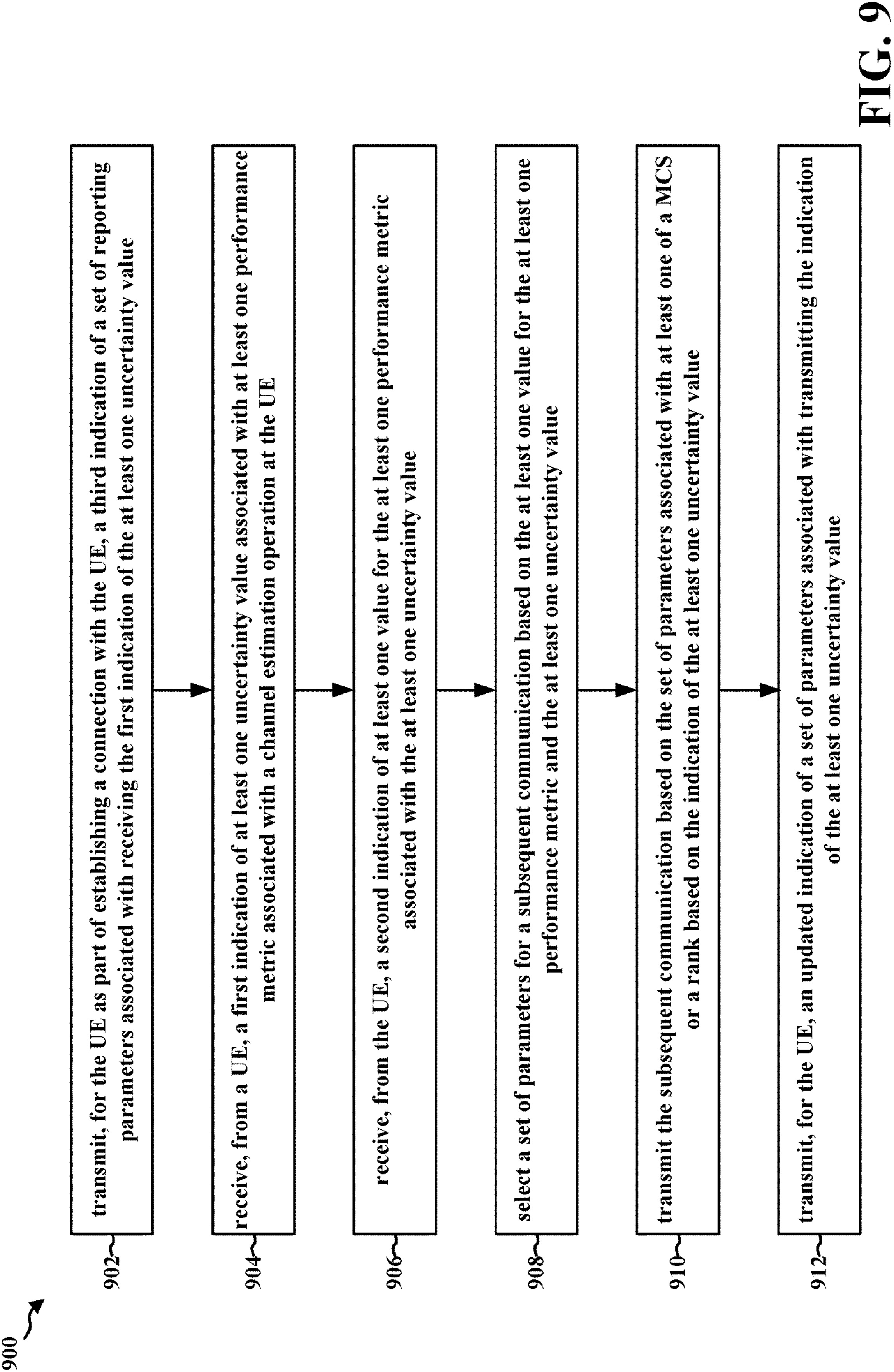
FIG. 9 is a flowchart of a method of wireless communication.

FIG. 9 is a flowchart 900 of a method of wireless communication. The method may be performed by a base station (e.g., the base station 102, 502; the network entity 1002, 1102). At 902, the base station may transmit, for a UE (e.g., a wireless device) as part of establishing a connection with the UE, a (third) indication of a set of parameters associated with transmitting an indication of at least one uncertainty value. For example, 902 may be performed by CU processor(s) 1112, DU processor(s) 1132. RU processor(s) 1142, transceiver(s) 1146, antenna(s) 1180, and/or MCS uncertainty reporting component 199 of FIG. 11. In some aspects, the set of parameters indicates a first subset of parameters associated with a capability of the network node and a second subset of parameters associated with a format for a first indication of at least one uncertainty value associated with at least one performance metric. The first subset of parameters, in some aspects may include a maximum number of retransmissions supported by the network node, a granularity of the retransmissions (e.g., the unit of retransmission such as one of CB, multiple CBs, RB, multiple RBs, TB, etc.), and a retransmission applicable size (e.g., a size associated with retransmissions that may, in some aspects, be based on an MCS LUT). The second subset of parameters, in some aspects, may indicate for the UE to transmit a plurality of MCS uncertainty values corresponding to at least one of: a plurality of sub-carriers, a plurality of RBs including 12 sub-carriers, a plurality of sub-bands including multiple RBs within a wideband transmission. In some aspects, the second subset of parameters may indicate for the UE to transmit an MCS uncertainty value corresponding to the full bandwidth (e.g., a set of frequency resources associated with the wideband transmission). For example, referring to FIG. 5, the base station 502 may transmit the uncertainty report configuration 508.

At 904, the base station may receive, from a UE, a first indication of at least one uncertainty value associated with at least one performance metric associated with a channel estimation operation at the UE. For example, 904 may be performed by CU processor(s) 1112, DU processor(s) 1132, RU processor(s) 1142, transceiver(s) 1146, antenna(s) 1180, and/or MCS uncertainty reporting component 199 of FIG. 11. The at least one uncertainty value, in some aspects, may be associated with one or more of a CQI or a RI. In some aspects, the at least one uncertainty value includes a first uncertainty value for at least one of a first MCS value or a rank indicator value. In some aspects, the at least one uncertainty value may be at least one hardware-dependent (e.g., a channel-condition-independent) uncertainty value calculated independently from a particular channel estimation operation. The at least one hardware-dependent uncertainty value, in some aspects, may include a hardware-dependent uncertainty value for each MCS for each supported rank. In some aspects, the hardware-dependent uncertainty value for each MCS for each supported rank may be associated with one of an MCS index or a code rate. The at least one hardware-dependent uncertainty value, in some aspects, may further be associated with one of: each frequency band in a plurality of frequency bands, each beam direction in a plurality of beam directions, or each SSB in a plurality of SSBs. In some aspects, the at least one uncertainty value may include a first uncertainty value associated with a first set of conditions (e.g., a first amount of resources associated with a PDSCH transmission that overlaps or is adjacent to an instance of CSI-RS, or for a first time from a last CSI-RS or reported uncertainty value) and a second uncertainty value associated with a second set of conditions (e.g., a second amount of resources associated with a PDSCH transmission that overlaps or is adjacent to an instance of CSI-RS, or for a second time from a last CSI-RS or reported uncertainty value). Receiving the hardware-dependent uncertainty value at 906, in some aspects, may be associated with establishing a connection with the UE for the channel estimation operation. For example, referring to FIG. 5, the base station 502 may receive the first indication of the one or more MCS uncertainty values 514 (that is a hardware-dependent uncertainty value not based on channel measurements).

In some aspects, the base station may participate in (e.g., transmit a CSI-RS for) a channel estimation operation and may receive CSI from the UE based on the channel estimation. The CSI, in some aspects, may include information regarding channel quality (e.g., a CQI) and a rank (e.g., an RI) that may be used in some aspects, to determine an MCS for subsequent data transmissions from the base station. The channel estimation and received CSI may be based on the indication of a set of parameters associated with transmitting the indication of the at least one uncertainty value. Accordingly, the indication received at 906 may alternatively, or additionally, include receiving the plurality of uncertainty values (e.g., MCS uncertainty values) corresponding to at least one of: the plurality of sub-carriers, the plurality of RBs including 12 sub-carriers, or the plurality of sub-bands including multiple RBs within a wideband transmission as indicated by the second subset of parameters. In some aspects, the indication received at 906 may include an MCS uncertainty value corresponding to the full bandwidth (e.g., a set of frequency resources associated with the wideband transmission). For example, referring to FIG. 5, the base station 502 may receive the first indication of the one or more MCS uncertainty values 514 based on hardware-dependent parameters/characteristics and/or the second indication of the one or more MCS uncertainty values 524 based on channel conditions estimated based on transmitting the one or more CSI-RS 516 as part of a channel estimation operation.

In some aspects, the at least one uncertainty value may include the at least one hardware-dependent uncertainty value. For example, referring to FIG. 5, the base station 502 may receive the first indication of the one or more MCS uncertainty values 514 from the UE 504. In some aspects, the at least one uncertainty value includes a first uncertainty value for a first MCS value. The first uncertainty value for the first MCS value, in some aspects, may be associated with a first modulation scheme (e.g., a first constellation from among QPSK, 16QAM, 64 QAM, etc.). In some aspects, the at least one uncertainty value may further include a second uncertainty value for a second MCS value associated with a second modulation scheme (e.g., a second constellation from among QPSK. 16QAM, 64 QAM, etc.). In some aspects, the at least one uncertainty value includes the plurality of MCS uncertainty values indicated in the second subset of parameters associated with a format for the first indication. For example, referring to FIG. 5, the base station 502 may receive the second indication of the one or more MCS uncertainty values 524.

At 906, the base station may receive, from the UE, a second indication of at least one value for the at least one performance metric associated with the at least one uncertainty value. For example, 906 may be performed by CU processor(s) 1112, DU processor(s) 1132, RU processor(s) 1142, transceiver(s) 1146, antenna(s) 1180, and/or MCS uncertainty reporting component 199 of FIG. 11. In some aspects, the at least one performance metric is one or more of a CQI or an RI. The at least one performance metric, in some aspects, may be based on the indication of the set of parameters associated with transmitting the indication of the at least one uncertainty value. For example, referring to FIG. 5, the base station 502 may receive the CSI 522 based on transmitting the one or more CSI-RS 516. As indicated in FIG. 5, the second indication may be received at 906, before receiving the first indication at 904.

The base station, in some aspects, may receive, from the UE, an indication of (e.g., a value indicating) whether the at least one uncertainty value (e.g., an uncertainty value received at 904) is different from a previously-reported uncertainty value. The indication of whether the at least one uncertainty value is different, in some aspects, may be transmitted in a CSI (a CSI received at 906 including the at least one value for the at least one performance metric) or as a separate indication. For example, referring to FIG. 5, the base station 502 may receive the CSI 522 from the UE 504 including an indication that the at least one uncertainty value is different from a previously-reported uncertainty value.

At 908, the base station may select a set of parameters for a subsequent communication based on the at least one value for the at least one performance metric and the at least one uncertainty value. For example, 908 may be performed by CU processor(s) 1112, DU processor(s) 1132, RU processor(s) 1142, and/or MCS uncertainty reporting component 199 of FIG. 11. In some aspects, the set of parameters may include determine an MCS (or rank) associated with the subsequent communication. The MCS (and/or the rank) for a PDSCH transmission (e.g., a first transmission associated with a MIRS or a PDSCH transmission associated with an OLLA) based on the first indication of the at least one uncertainty value received at 904 and the second indication received at 906. Selecting the set of parameters at 908, in some aspects, may further be based on a time offset (e.g., a distance in time) from a CSI-RS used to determine the set of parameters for the subsequent communication. In some aspects using the uncertainty value reporting for OLLA, the hardware-dependent uncertainty value may be sufficient to provide improved performance and the MCS or the rank may be based on the indication of the at least one hardware-dependent uncertainty value without the additional uncertainty value based on the channel estimation (e.g., the base station may omit receiving the uncertainty value based on the channel estimation). For example, referring to FIG. 5, the base station 502 may determine, at 526, an MCS and/or rank based on the first indication of the one or more MCS uncertainty values 514, based on the second indication of the one or more MCS uncertainty values 524, or based on both the first indication of the one or more MCS uncertainty values 514 and based on the second indication of the one or more MCS uncertainty values 524.

At 910, the base station may transmit a data transmission associated with the selected set of parameters. For example, 910 may be performed by CU processor(s) 1112, DU processor(s) 1132, RU processor(s) 1142, transceiver(s) 1146, antenna(s) 1180, and/or MCS uncertainty reporting component 199 of FIG. 11. In some aspects, the data transmission may be a PDSCH transmission associated with the MIRS. For example, referring to FIG. 5, the base station 502 may transmit the PDSCH transmission 528 based on the MCS and/or rank determined at 526.

The base station, in some aspects, may receive feedback (e.g., a HARQ or IR-HARQ) in response to the data transmitted at 910. The at least one of the MCS or rank may be based on a reported value in CSI (e.g., associated with the identified performance metric) and the uncertainty value. For example, referring to FIG. 5, the base station 502 may receive the PDSCH transmission 528 based on the MCS and/or rank determined at 526.

At 912, the base station may transmit, for the UE, an updated indication of a set of parameters associated with transmitting the indication of the at least one uncertainty value. For example, 912 may be performed by CU processor(s) 1112, DU processor(s) 1132, RU processor(s) 1142, transceiver(s) 1146, antenna(s) 1180, and/or MCS uncertainty reporting component 199 of FIG. 11. The updated indication, in some aspects, may indicate whether to dedicate additional resources (e.g., in the form of a minimum number of resources, a maximum uncertainty that is useful to report, or other related parameter) and/or whether to discontinue the transmission of the uncertainty value reports. In some aspects, the updated indication may include an update to the parameters associated with the MIRS or a (desired/requested) granularity of the uncertainty value report(s) as discussed for the indication of the set of parameters transmitted at 902. For example, referring to FIG. 5, the base station 502 may transmit the updated uncertainty report configuration 532 based on the feedback 529.

Figure 10:
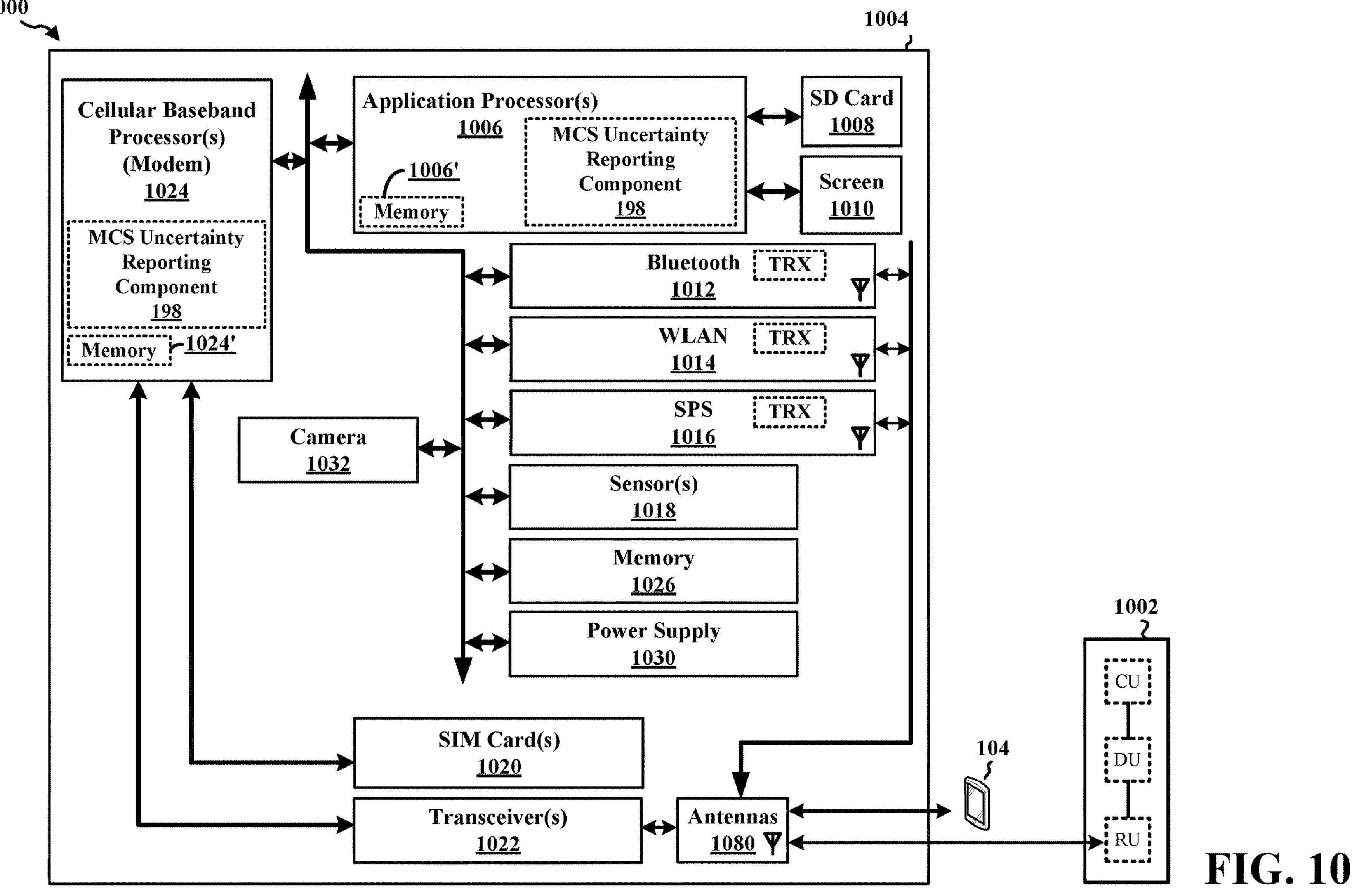
FIG. 10 is a diagram illustrating an example of a hardware implementation for an apparatus.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include at least one cellular baseband processor 1024 (also referred to as a modem) coupled to one or more transceivers 1022 (e.g., cellular RF transceiver). The cellular baseband processor(s) 1024 may include at least one on-chip memory 1024'. In some aspects, the apparatus 1004 may further include one or more subscriber identity modules (SIM) cards 1020 and at least one application processor 1006 coupled to a secure digital (SD) card 1008 and a screen 1010. The application processor(s) 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize one or more antennas 1080 for communication. The cellular baseband processor(s) 1024 communicates through the transceiver(s) 1022 via the one or more antennas 1080 with the UE 104 and/or with an RU associated with a network entity 1002. The cellular baseband processor(s) 1024 and the application processor(s) 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor(s) 1024 and the application processor(s) 1006 are each responsible for general processing, including the execution of software stored on the computer-readable medium/memory. The software, when executed by the cellular baseband processor(s) 1024/application processor(s) 1006, causes the cellular baseband processor(s) 1024/application processor(s) 1006 to perform the various functions described supra. The computer-readable medium/memory may also be used for storing data that is manipulated by the cellular baseband processor(s) 1024/application processor(s) 1006 when executing software. The cellular baseband processor(s) 1024/application processor(s) 1006 may be a component of the UE 350 and may include the at least one memory 360 and/or at least one of the TX processor 368, the RX processor 356, and the controller/processor 359. In one configuration, the apparatus 1004 may be at least one processor chip (modem and/or application) and include just the cellular baseband processor(s) 1024 and/or the application processor(s) 1006, and in another configuration, the apparatus 1004 may be the entire UE (e.g., see UE 350 of FIG. 3) and include the additional modules of the apparatus 1004.

As discussed supra, the MCS uncertainty reporting component 198 may be configured to identify at least one performance metric associated with a channel estimation operation at the UE. The MCS uncertainty reporting component 198 may further be configured to calculate at least one uncertainty value associated with the at least one performance metric. The MCS uncertainty reporting component 198 may also be configured to transmit, to a network node, an indication of the at least one uncertainty value associated with the at least one performance metric. The MCS uncertainty reporting component 198 may be within the cellular baseband processor(s) 1024, the application processor(s) 1006, or both the cellular baseband processor(s) 1024 and the application processor(s) 1006. The MCS uncertainty reporting component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1004 may include a variety of components configured for various functions. In one configuration, the apparatus 1004, and in particular the cellular baseband processor(s) 1024 and/or the application processor(s) 1006, may include means for identifying at least one performance metric associated with a channel estimation operation at the UE. The apparatus 1004, and in particular the cellular baseband processor(s) 1024 and/or the application processor(s) 1006, may further include means for calculating at least one uncertainty value associated with the at least one performance metric. The apparatus 1004, and in particular the cellular baseband processor(s) 1024 and/or the application processor(s) 1006, may further include means for transmitting, to a network node, an indication of the at least one uncertainty value associated with the at least one performance metric. The apparatus 1004, and in particular the cellular baseband processor(s) 1024 and/or the application processor(s) 1006, may further include means for receiving, from the network node as part of establishing a connection with the UE, a second indication of a set of parameters associated with transmitting the indication of the at least one uncertainty value. The apparatus 1004, and in particular the cellular baseband processor(s) 1024 and/or the application processor(s) 1006, may further include means for transmitting a value indicating whether the at least one uncertainty value is different from a previously-reported uncertainty value. The apparatus 1004, and in particular the cellular baseband processor(s) 1024 and/or the application processor(s) 1006, may further include means for receiving a data transmission associated with at least one of an MCS or a rank based on the indication of the at least one uncertainty value. The means may be the MCS uncertainty reporting component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means or as described in relation to FIGS. 6 and 7.

Figure 11:
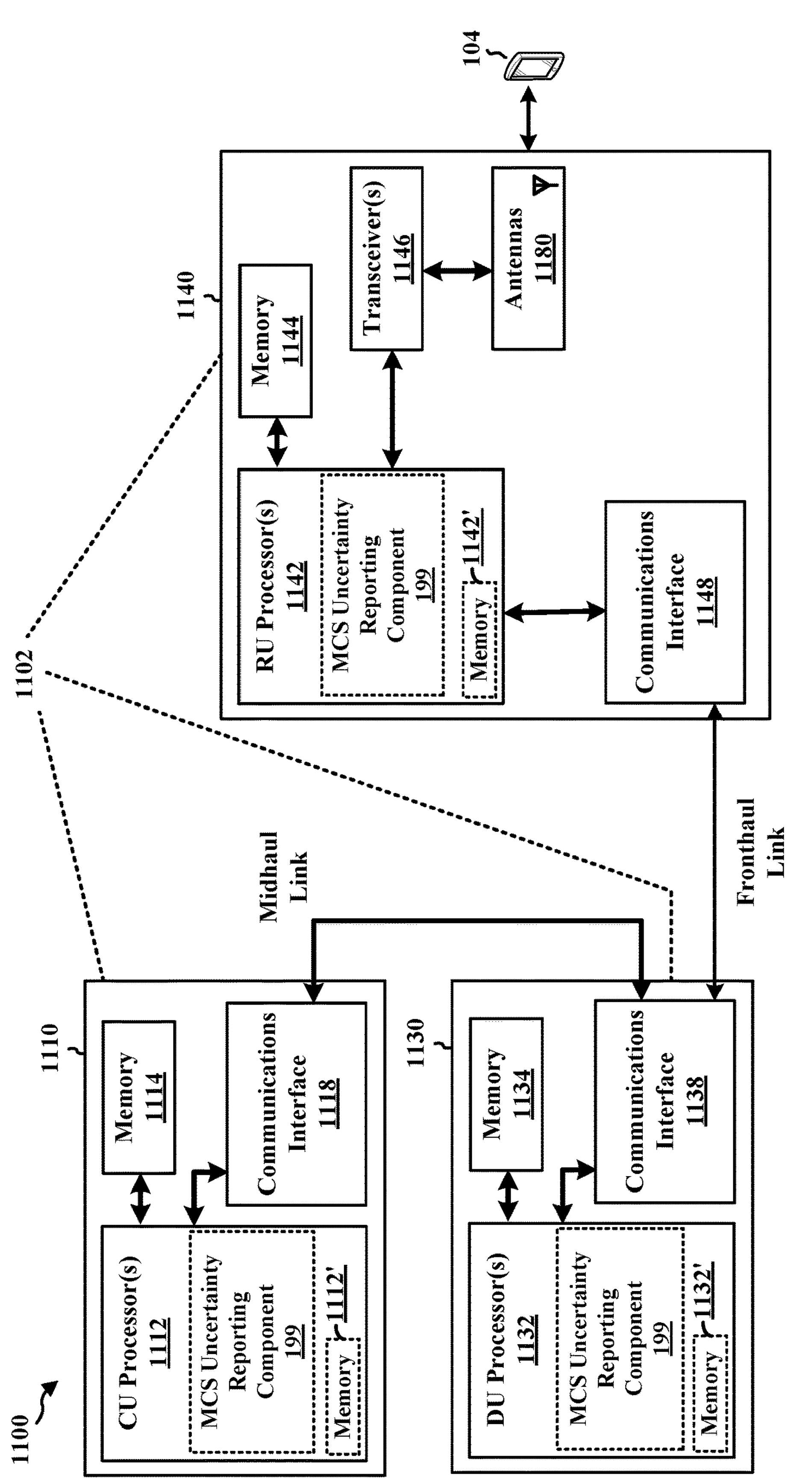
FIG. 11 is a diagram illustrating an example of a hardware implementation for a network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include at least one CU processor 1112. The CU processor(s) 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include at least one DU processor 1132. The DU processor(s) 1132 may include on-chip memory 1132'. In some aspects, the DU 1130 may further include additional memory modules 1134 and a communications interface 1138. The DU 1130 communicates with the RU 1140 through a fronthaul link. The RU 1140 may include at least one RU processor 1142. The RU processor(s) 1142 may include on-chip memory 1142'. In some aspects, the RU 1140 may further include additional memory modules 1144, one or more transceivers 1146, one or more antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the MCS uncertainty reporting component 199 may be configured to receive, from a UE, a first indication of at least one uncertainty value associated with at least one performance metric associated with a channel estimation operation at the UE. The MCS uncertainty reporting component 199 may further be configured to receive, from the UE, a second indication of at least one value for the at least one performance metric associated with the at least one uncertainty value. The MCS uncertainty reporting component 199 may also be configured to select a set of parameters for a subsequent communication based on the at least one value for the at least one performance metric and the at least one uncertainty value. The MCS uncertainty reporting component 199 may be within one or more processors of one or more of the CU 1110, DU 1130, and the RU 1140. The MCS uncertainty reporting component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1102 may include a variety of components configured for various functions. In one configuration, the network entity 1102 may include means for receiving, from a UE, a first indication of at least one uncertainty value associated with at least one performance metric associated with a channel estimation operation at the UE. In one configuration, the network entity 1102 may include means for receiving, from the UE, a second indication of at least one value for the at least one performance metric associated with the at least one uncertainty value. In one configuration, the network entity 1102 may include means for selecting a set of parameters for a subsequent communication based on the at least one value for the at least one performance metric and the at least one uncertainty value. In one configuration, the network entity 1102 may include means for transmitting, for the UE as part of establishing a connection with the UE, a third indication of a set of reporting parameters associated with receiving the first indication of the at least one uncertainty value. In one configuration, the network entity 1102 may include means for transmitting, for the UE, the subsequent communication based on the selected set of parameters. The means may be the MCS uncertainty reporting component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means or as described in relation to FIGS. 8 and 9.

Various aspects of the disclosure relate generally to an improvement to a MIRS (or OLLA) involving transmitting, from a receiving device, an uncertainty report associated with an MCS indicated by the receiving device (e.g., based on a receiving device's MCS estimation capabilities, channel conditions, Doppler effects, interference, SINR, etc.). For example, in some aspects of the disclosure, the receiving device (e.g., a wireless device or UE) may report to the transmitting device (e.g., a base station or network node) an indication of an uncertainty (e.g., an uncertainty report) associated with a CQI (or RI) estimation (e.g., via CSI) that the transmitting device may use to determine a (dynamic) gap (or offset) between a second higher MCS used for the first MIRS transmission and an MCS based on values reported by the receiving device (e.g., a CQI and/or RI reported via a CSI) to reduce the latency associated with identifying or determining an MCS using the MIRS. Reducing the latency, in some aspects, may be based on the (dynamic) gap (based on the reported uncertainty value and reported the CQI/RI estimation) being smaller than the (static) gap or offset (based on the reported CQI/RI estimation) such that a number of failed transmissions, and an associated time, due to intentionally using a too-high MCS for the first transmission is reduced for the MIRS.

While both the (static) gap, or offset, and the (dynamic) gap, or offset, may be based on a maximum expected difference between an MCS value based on set of measured values (e.g., values included in a CSI) and an optimal (or highest) MCS, the (dynamic) gap, or offset, may be associated with a smaller maximum expected difference based on the additional information provided by the receiving device. For example, a UE may report an MCS uncertainty value of "one MCS" such that, a base station may determine to use an MCS for a first transmission of the MIRS that is one MCS, or MCS index value, higher than a reported MCS (e.g., an MCS associated with a value reported in, or associated with, a CSI such as a CQI, RI, SINR, RSRP, RSSI, etc.) instead of a larger number of MCSs (e.g., three MCSs, or MCS index values, as described above). Accordingly, the optimal MCS may be identified with reduced latency when using the MIRS with the MCS uncertainty value compared to the latency associated with using the MIRS without the MCS uncertainty value without affecting the performance (e.g., arriving at the same optimal MCS or code rate).

When applied to OLLA used between CSI-RS, the uncertainty value may provide a transmitting device (e.g., a network node or base station) with additional information that may improve the selection of an MCS for a subsequent transmission. For example, knowing that a reported value for a performance metric used to determine an MCS has an associated uncertainty of a first magnitude (e.g., a larger than assumed magnitude) may allow the transmitting device to increase an MCS (and an associated throughput) for a subsequent transmission beyond an MCS that may have been selected based on the reported value for the performance metric without the additional information.

Particular aspects of the subject matter described in this disclosure can be implemented to realize one or more of the following potential advantages. In some examples, by reporting at least one uncertainty value associated with at least one performance metric, the described techniques can be used to increase a throughput associated with one of an OLLA, the MIRS, or other method of determining an MCS for a particular communication. Additionally, for the MIRS, the reporting of the uncertainty values may improve a latency associated with identifying (or converging to) an optimized MCS (e.g., a code rate and constellation) and throughput.

In summary, MIRS is a suggested method for improving the channel state feedback (CSF) report, with a tighter utilization of the instantaneous capacity. MIRS relies on an attempt to transmit an MCS which is higher in capacity compared to what was recommended in CQI. The disclosure above suggests that the UE will also recommend to a base station (e.g., a gNB) by how much the MCS should go higher in the first attempt of transmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A. B. and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C. B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: identifying at least one performance metric associated with a channel estimation operation at the UE, calculating at least one uncertainty value associated with the at least one performance metric, and transmitting, to a network node, an indication of the at least one uncertainty value associated with the at least one performance metric.

Aspect 2 is the method of aspect 1, where the at least one performance metric is one or more of a channel quality indicator (CQI) or a rank indicator (RI), and wherein the at least one uncertainty value is associated with one or more of the CQI or the RI.

Aspect 3 is the method of any of aspects 1 and 2, wherein the at least one uncertainty value comprises a first uncertainty value for at least one of a first modulation and coding scheme (MCS) value or a rank indicator value.

Aspect 4 is the method of aspect 3, wherein the first uncertainty value for the first MCS value is associated with a first modulation scheme, and wherein the at least one uncertainty value further comprises a second uncertainty value for a second MCS value associated with a second modulation scheme.

Aspect 5 is the method of any of aspects 3 and 4, wherein the indication is a first indication, the method further comprising: receiving, from the network node as part of establishing a connection with the UE, a second indication of a set of parameters associated with transmitting the indication of the at least one uncertainty value, wherein the set of parameters indicates a first subset of parameters associated with a capability of the network node and a second subset of parameters associated with a format for the first indication.

Aspect 6 is the method of aspect 5, wherein the second subset of parameters associated with the format for the first indication indicates for the UE to transmit a plurality of MCS uncertainty values corresponding to at least one of: a plurality of sub-carriers, a plurality of resource blocks (RBs) comprising 12 sub-carriers, or a plurality of sub-band comprising multiple RBs within a wideband transmission.

Aspect 7 is the method of aspect 6, wherein the at least one uncertainty value comprises the plurality of MCS uncertainty values.

Aspect 8 is the method of any of aspects 1 to 7, wherein the at least one uncertainty value comprises at least one hardware-dependent uncertainty value calculated independently from a particular channel estimation operation.

Aspect 9 is the method of aspect 8, wherein the at least one hardware-dependent uncertainty value comprises a hardware-dependent uncertainty value for each modulation and coding scheme (MCS) for each supported rank, wherein the hardware-dependent uncertainty value for each MCS for each supported rank is associated with one of an MCS index or a code rate, wherein the at least one hardware-dependent uncertainty value is further associated with one of: each frequency band in a plurality of frequency bands, each beam direction in a plurality of beam directions, or each synchronization signal block (SSB) in a plurality of SSBs.

Aspect 10 is the method of any of aspects 8 and 9, wherein calculating the hardware-dependent uncertainty value and transmitting the indication of the hardware-dependent uncertainty value are associated with establishing a connection with the network node for the channel estimation operation.

Aspect 11 is the method of any of aspects 1 to 10, wherein the at least one uncertainty value comprises a first uncertainty value associated with a first set of conditions and a second uncertainty value associated with a second set of conditions.

Aspect 12 is the method of any of aspects 1 to 11, further comprising: transmitting a value indicating whether the at least one uncertainty value is different from a previously-reported uncertainty value.

Aspect 13 is the method of any of aspects 1 to 12, further comprising: receiving a data transmission associated with at least one of a modulation and coding scheme (MCS) or a rank based on the indication of the at least one uncertainty value.

Aspect 14 is a method of wireless communication for a network node, comprising: receiving, from a user equipment (UE), a first indication of at least one uncertainty value associated with at least one performance metric associated with a channel estimation operation at the UE; receiving, from the UE, a second indication of at least one value for the at least one performance metric associated with the at least one uncertainty value; and selecting a set of parameters for a subsequent communication based on the at least one value for the at least one performance metric and the at least one uncertainty value.

Aspect 15 is the method of aspect 14, wherein the at least one performance metric is one or more of a channel quality indicator (CQI) or a rank indicator (RI), and wherein the at least one uncertainty value is associated with one or more of the CQI or the RI.

Aspect 16 is the method of any of aspects 14 and 15, wherein the at least one uncertainty value comprises a first uncertainty value for at least one first modulation and coding scheme (MCS) value or a rank indicator value.

Aspect 17 is the method of aspect 16, wherein the first uncertainty value for the first MCS value is associated with a first modulation scheme, and wherein the at least one uncertainty value further comprises a second uncertainty value for a second MCS value associated with a second modulation scheme.

Aspect 18 is the method of any of aspects 16 and 17, further comprising: transmitting, for the UE as part of establishing a connection with the UE, a third indication of a set of reporting parameters associated with receiving the first indication of the at least one uncertainty value, wherein the set of reporting parameters indicates a first subset of parameters associated with a capability of the network node and a second subset of parameters associated with a format for the first indication.

Aspect 19 is the method of aspect 18, wherein the second subset of parameters associated with the format for the first indication indicates for the UE to transmit a plurality of MCS uncertainty values corresponding to at least one of: a plurality of sub-carriers, a plurality of resource blocks (RBs) comprising 12 sub-carriers, or a plurality of sub-band comprising multiple RBs within a wideband transmission.

Aspect 20 is the method of aspect 19, wherein the at least one value for the at least one performance metric associated with the at least one uncertainty value comprises the plurality of MCS uncertainty values.

Aspect 21 is the method of any of aspects 14 to 20, wherein the at least one uncertainty value comprises at least one hardware-dependent uncertainty value calculated independently from a particular channel estimation operation.

Aspect 22 is the method of aspect 21, wherein the at least one hardware-dependent uncertainty value comprises a hardware-dependent uncertainty value for each modulation and coding scheme (MCS) for each supported rank, wherein the hardware-dependent uncertainty value for each MCS for each supported rank is associated with one of an MCS index or a code rate, wherein the at least one hardware-dependent uncertainty value is further associated with one of: each frequency band in a plurality of frequency bands, each beam direction in a plurality of beam directions, or each synchronization signal block (SSB) in a plurality of SSBs.

Aspect 23 is the method of any of aspects 14 to 22, wherein the at least one uncertainty value comprises a first uncertainty value associated with a first set of conditions and a second uncertainty value associated with a second set of conditions.

Aspect 24 is the method of any of aspects 14 to 23, wherein the subsequent communication is associated with at least one feedback-dependent parameter optimization operation.

Aspect 25 is an apparatus for wireless communication at a device including a memory and at least one processor coupled to the memory and, based at least in part on information stored in the memory, the at least one processor, individually or in any combination, is configured to implement any of aspects 1 to 24.

Aspect 26 is the apparatus of aspect 25, further including a transceiver or an antenna coupled to the at least one processor.

Aspect 27 is an apparatus for wireless communication at a device including means for implementing any of aspects 1 to 24.

Aspect 28 is a computer-readable medium (e.g., a non-transitory computer-readable medium) storing computer executable code, where the code when executed by at least one processor causes the processor, individually or in any combination, to implement any of aspects 1 to 24.

What is claimed is:

1. An apparatus for wireless communication at a user equipment (UE), comprising:

at least one memory; and at least one processor coupled to the at least one memory and, based at least in part on information stored in the at least one memory, the at least one processor, individually or in any combination, is configured to:

identify at least one performance metric associated with a channel estimation operation at the UE;

calculate at least one uncertainty value associated with a multiple incremental redundancy scheme (MIRS), wherein the uncertainty value is based on the at least one performance metric; and transmit, to a network node, an indication of the at least one uncertainty value associated with the at least one performance metric.

2. The apparatus of claim 1, wherein the at least one performance metric is one or more of a channel quality indicator (CQI) or a rank indicator (RI), and wherein the at least one uncertainty value is based on one or more of the CQI or the RI.

3. The apparatus of claim 1, wherein the at least one uncertainty value comprises a first uncertainty value for at least one of a first modulation and coding scheme (MCS) value or a rank indicator value.

4. The apparatus of claim 3, wherein the first uncertainty value for the first MCS value is associated with a first modulation scheme, and wherein the at least one uncertainty value further comprises a second uncertainty value for a second MCS value associated with a second modulation scheme.

5. The apparatus of claim 3, wherein the indication is a first indication, the at least one processor, individually or in any combination, is further configured to:

receive, from the network node as part of establishing a connection with the UE, a second indication of a set of parameters associated with transmitting the indication of the at least one uncertainty value, wherein the set of parameters indicates a first subset of parameters associated with a capability of the network node and a second subset of parameters associated with a format for the first indication.

6. The apparatus of claim 5, wherein the second subset of parameters associated with the format for the first indication indicates for the UE to transmit a plurality of MCS uncertainty values corresponding to at least one of: a plurality of sub-carriers, a plurality of resource blocks (RBs) comprising 12 sub-carriers, or a plurality of sub-band comprising multiple RBs within a wideband transmission.

7. The apparatus of claim 6, wherein the at least one uncertainty value comprises the plurality of MCS uncertainty values.

8. The apparatus of claim 1, wherein the at least one uncertainty value comprises at least one hardware-dependent uncertainty value calculated independently from a particular channel estimation operation.

9. The apparatus of claim 8, wherein the at least one hardware-dependent uncertainty value comprises a hardware-dependent uncertainty value for each modulation and coding scheme (MCS) for each supported rank, wherein the hardware-dependent uncertainty value for each MCS for each supported rank is associated with one of an MCS index or a code rate, wherein the at least one hardware-dependent uncertainty value is further associated with one of: each frequency band in a plurality of frequency bands, each beam direction in a plurality of beam directions, or each synchronization signal block (SSB) in a plurality of SSBs.

10. The apparatus of claim 8, wherein the at least one processor, individually or in any combination, is further configured to calculate the at least one hardware-dependent uncertainty value and to transmit the indication of the at least one hardware-dependent uncertainty value in association with establishing a connection with the network node for the channel estimation operation.

11. The apparatus of claim 1, wherein the at least one uncertainty value comprises a first uncertainty value associated with a first set of conditions and a second uncertainty value associated with a second set of conditions.

12. The apparatus of claim 1, the at least one processor, individually or in any combination, is further configured to:

transmit a value indicating whether the at least one uncertainty value is different from a previously-reported uncertainty value.

13. The apparatus of claim 1, the at least one processor, individually or in any combination, is further configured to:

receive a data transmission associated with at least one of a modulation and coding scheme (MCS) or a rank based on the indication of the at least one uncertainty value.

14. The apparatus of claim 1, further comprising a transceiver coupled to the at least one processor, wherein to transmit the indication, the at least one processor, individually or in any combination, is configured to: transmit, to the network node via the transceiver, the indication of the at least one uncertainty value associated with the at least one performance metric.

15. An apparatus of communication for a network node, comprising:

at least one memory; and at least one processor coupled to the at least one memory and, based at least in part on information stored in the at least one memory, the at least one processor, individually or in any combination, is configured to:

receive, from a user equipment (UE), a first indication of at least one uncertainty value is associated with a multiple incremental redundancy scheme (MIRS), wherein the at least one uncertainty value is based on at least one performance metric associated with a channel estimation operation at the UE;

receive, from the UE, a second indication of at least one value for the at least one performance metric associated with the at least one uncertainty value; and select a set of parameters for a subsequent communication, using the MIRS, based on the at least one value for the at least one performance metric and the at least one uncertainty value.

16. The apparatus of claim 15, wherein the at least one performance metric is one or more of a channel quality indicator (CQI) or a rank indicator (RI), and wherein the at least one uncertainty value is based on one or more of the CQI or the RI.

17. The apparatus of claim 15, wherein the at least one uncertainty value comprises a first uncertainty value for at least one first modulation and coding scheme (MCS) value or a rank indicator value.

18. The apparatus of claim 17, wherein the first uncertainty value for the first MCS value is associated with a first modulation scheme, and wherein the at least one uncertainty value further comprises a second uncertainty value for a second MCS value associated with a second modulation scheme.

19. The apparatus of claim 17, wherein the at least one processor, individually or in any combination, is further configured to:

transmit, for the UE as part of establishing a connection with the UE, a third indication of a set of reporting parameters associated with receiving the first indication of the at least one uncertainty value, wherein the set of reporting parameters indicates a first subset of parameters associated with a capability of the network node and a second subset of parameters associated with a format for the first indication.

20. The apparatus of claim 19, wherein the second subset of parameters associated with the format for the first indication indicates for the UE to transmit a plurality of MCS uncertainty values corresponding to at least one of: a plurality of sub-carriers, a plurality of resource blocks (RBs) comprising 12 sub-carriers, or a plurality of sub-band comprising multiple RBs within a wideband transmission.

21. The apparatus of claim 20, wherein the at least one value for the at least one performance metric associated with the at least one uncertainty value comprises the plurality of MCS uncertainty values.

22. The apparatus of claim 15, wherein the at least one uncertainty value comprises at least one hardware-dependent uncertainty value calculated independently from a particular channel estimation operation.

23. The apparatus of claim 22, wherein the at least one hardware-dependent uncertainty value comprises a hardware-dependent uncertainty value for each modulation and coding scheme (MCS) for each supported rank, wherein the hardware-dependent uncertainty value for each MCS for each supported rank is associated with one of an MCS index or a code rate, wherein the at least one hardware-dependent uncertainty value is further associated with one of: each frequency band in a plurality of frequency bands, each beam direction in a plurality of beam directions, or each synchronization signal block (SSB) in a plurality of SSBs.

24. The apparatus of claim 15, wherein the at least one uncertainty value comprises a first uncertainty value associated with a first set of conditions and a second uncertainty value associated with a second set of conditions.

25. The apparatus of claim 15, wherein the subsequent communication is associated with at least one feedback-dependent parameter optimization operation.

26. The apparatus of claim 15, further comprising a transceiver coupled to the at least one processor, wherein to receive the first indication and the second indication, the at least one processor, individually or in any combination, is configured to:

receive, via the transceiver, the first indication; and receive, via the transceiver, the second indication.

27. A method of communication for a user equipment (UE), comprising:

identifying at least one performance metric associated with a channel estimation operation at the UE;

calculating at least one uncertainty value associated with a multiple incremental redundancy scheme (MIRS), wherein the at least one uncertainty value is based on the at least one performance metric; and transmitting, to a network node, an indication of the at least one uncertainty value associated with the MIRS.

28. The method of claim 27, wherein the at least one performance metric is one or more of a channel quality indicator (CQI) or a rank indicator (RI), and wherein the at least one uncertainty value is based on the one or more of the CQI or the RI.

29. A method of communication for a network node, comprising:

receiving, from a user equipment (UE), a first indication of at least one uncertainty value associated with a multiple incremental redundancy scheme (MIRS), wherein the at least one uncertainty value is independent from a channel estimation operation at the UE;

receiving, from the UE, a second indication of the at least one uncertainty value based on at least one performance metric associated with a channel estimation operation at the UE; and selecting a set of parameters for a subsequent communication, using the MIRS, based on the second indication of the at least one uncertainty value.

30. The method of claim 29, wherein the at least one performance metric is one or more of a channel quality indicator (CQI) or a rank indicator (RI), and wherein the at least one uncertainty value is based on the one or more of the CQI or the RI.

* * * * *